(12) United States Patent
Tabata et al.

(10) Patent No.: US 11,572,601 B2
(45) Date of Patent: Feb. 7, 2023

(54) COATED STEEL MEMBER, COATED STEEL SHEET, AND METHODS FOR PRODUCING SAME

(71) Applicant: NIPPON STEEL CORPORATION, Tokyo (JP)

(72) Inventors: Shinichiro Tabata, Tokyo (JP); Daisuke Maeda, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 17/298,369

(22) PCT Filed: Mar. 30, 2020

(86) PCT No.: PCT/JP2020/014581
§ 371 (c)(1),
(2) Date: May 28, 2021

(87) PCT Pub. No.: WO2020/203979
PCT Pub. Date: Oct. 8, 2020

(65) Prior Publication Data
US 2022/0002830 A1  Jan. 6, 2022

(30) Foreign Application Priority Data

Mar. 29, 2019 (JP) .............................. JP2019-068658

(51) Int. Cl.
*B32B 15/01* (2006.01)
*C22C 38/00* (2006.01)
(Continued)

(52) U.S. Cl.
CPC .............. *C21D 9/46* (2013.01); *B32B 15/011* (2013.01); *C21D 6/004* (2013.01); *C21D 6/005* (2013.01);
(Continued)

(58) Field of Classification Search
CPC ... C22C 38/001; C22C 38/002; C22C 38/005; C22C 38/008; C22C 38/02; C22C 38/04;
(Continued)

(56) References Cited

U.S. PATENT DOCUMENTS

| 2014/0212684 A1 | 7/2014 | Kawata et al. |
| 2016/0017452 A1 | 1/2016 | Puerta Velasquez et al. |

(Continued)

FOREIGN PATENT DOCUMENTS

| JP | 7-157883 A | 6/1995 |
| JP | 8-155572 A | 6/1996 |

(Continued)

*Primary Examiner* — Humera N. Sheikh
*Assistant Examiner* — Katherine A Christy
(74) *Attorney, Agent, or Firm* — Birch, Stewart, Kolasch & Birch, LLP

(57) ABSTRACT

This coated steel member includes: a steel sheet substrate having a predetermined chemical composition; and a coating formed on a surface of the steel sheet substrate and containing Al and Fe, in which the coating has a low Al content region having an Al content of 3 mass % or more and less than 30 mass % and a high Al content region formed on a side closer to a surface than the low Al content region and having an Al content of 30 mass % or more, a maximum C content of the high Al content region is 25% or less of a C content of the steel sheet substrate, a maximum C content of the low Al content region is 40% or less of the C content of the steel sheet substrate, and a maximum C content in a range from an interface between the steel sheet substrate and the coating to a depth of 10 μm on a side of the steel sheet substrate is 80% or less of the C content of the steel sheet substrate.

6 Claims, 1 Drawing Sheet

(51) Int. Cl.

| | | |
|---|---|---|
| *C22C 38/02* | (2006.01) | |
| *C22C 38/04* | (2006.01) | |
| *C22C 38/06* | (2006.01) | |
| *C22C 38/42* | (2006.01) | |
| *C22C 38/44* | (2006.01) | |
| *C22C 38/46* | (2006.01) | |
| *C22C 38/48* | (2006.01) | |
| *C22C 38/50* | (2006.01) | |
| *C22C 38/54* | (2006.01) | |
| *C22C 38/60* | (2006.01) | |
| *C23C 2/12* | (2006.01) | |
| *C21D 9/46* | (2006.01) | |
| *C21D 6/00* | (2006.01) | |
| *C21D 8/02* | (2006.01) | |
| *C23C 2/02* | (2006.01) | |
| *C23C 2/28* | (2006.01) | |

(52) U.S. Cl.
CPC ........... *C21D 6/008* (2013.01); *C21D 8/0205* (2013.01); *C21D 8/0226* (2013.01); *C21D 8/0236* (2013.01); *C21D 8/0263* (2013.01); *C22C 38/001* (2013.01); *C22C 38/002* (2013.01); *C22C 38/005* (2013.01); *C22C 38/008* (2013.01); *C22C 38/02* (2013.01); *C22C 38/04* (2013.01); *C22C 38/06* (2013.01); *C22C 38/42* (2013.01); *C22C 38/44* (2013.01); *C22C 38/46* (2013.01); *C22C 38/48* (2013.01); *C22C 38/50* (2013.01); *C22C 38/54* (2013.01); *C22C 38/60* (2013.01); *C23C 2/02* (2013.01); *C23C 2/12* (2013.01); *C23C 2/28* (2013.01)

(58) Field of Classification Search
CPC ......... C22C 38/06; C22C 38/42; C22C 38/44; C22C 38/46; C22C 38/48; C22C 38/50; C22C 38/54; C22C 38/60; B32B 15/011
USPC ........................................................ 428/683
See application file for complete search history.

(56) References Cited

U.S. PATENT DOCUMENTS

| | | |
|---|---|---|
| 2017/0081741 A1 | 3/2017 | Tabata et al. |
| 2017/0081742 A1 | 3/2017 | Tabata et al. |
| 2020/0001342 A1 | 1/2020 | Toda et al. |
| 2020/0016866 A1 | 1/2020 | Toda et al. |
| 2020/0230681 A1 | 7/2020 | Toda et al. |
| 2020/0232056 A1 | 7/2020 | Toda et al. |

FOREIGN PATENT DOCUMENTS

| | | |
|---|---|---|
| JP | 2002-102980 A | 4/2002 |
| JP | 2004-244704 A | 9/2004 |
| JP | 2007-146201 A | 6/2007 |
| JP | 2012-1802 A | 1/2012 |
| JP | 2012-180594 A | 9/2012 |
| JP | 2016-504488 A | 2/2016 |
| KR | 10-2013-0023274 A | 3/2013 |
| KR | 10-1597473 B1 | 2/2016 |
| WO | WO 2015/033177 A1 | 3/2015 |
| WO | WO 2015/182591 A1 | 12/2015 |
| WO | WO 2015/182596 A1 | 12/2015 |
| WO | WO 2018/151325 A1 | 8/2018 |
| WO | WO 2018/151330 A1 | 8/2018 |
| WO | WO 2018/151332 A1 | 8/2018 |
| WO | WO 2018/151333 A1 | 8/2018 |

COATED STEEL MEMBER, COATED STEEL SHEET, AND METHODS FOR PRODUCING SAME

TECHNICAL FIELD OF THE INVENTION

The present invention relates to a coated steel member, a coated steel sheet, and methods for producing the same.

Priority is claimed on Japanese Patent Application No. 2019-068658, filed Mar. 29, 2019, the content of which is incorporated herein by reference.

BACKGROUND ART

In the field of steel sheets for a vehicle, against the background of tightening of recent environmental regulations and collision safety standards, the application of steel sheets having high tensile strength (high strength steel sheet) has expanded in order to improve both the fuel economy and collision safety. However, the press formability of a steel sheet decreases with high-strengthening, which makes it difficult to produce a product having a complex shape.

Specifically, the ductility of the steel sheet decreases with the high-strengthening, and there is a problem that the steel sheet is fractured at a highly processed portion in a case of being processed into a complex shape. In addition, with the high-strengthening of the steel sheet, the residual stress after processing causes springback and wall warpage, which also causes a problem that the dimensional accuracy is deteriorated. Therefore, it is not easy to perform press forming on a steel sheet having high strength, particularly a tensile strength of 780 MPa or more, into a product having a complex shape. Roll forming rather than press forming makes it easier to process a high strength steel sheet, but the application thereof is limited to components having a uniform cross section in the longitudinal direction.

Therefore, in recent years, for example, as disclosed in Patent Documents 1 to 3, a hot stamping technique has been adopted as a technique for press-forming a material that is difficult to form, such as a high strength steel sheet. The hot stamping technique is a hot forming technique of heating a material to be subjected to forming and then forming the material.

In this technique, the material is formed after being heated. Therefore, the steel is soft at the time of forming and has good formability. Accordingly, even a high strength steel sheet can be accurately formed into a complex shape. Furthermore, in the hot stamping technique, since hardening is performed simultaneously with forming by a press die, the steel member after the forming has sufficient strength.

For example, according to Patent Document 1, it is disclosed that it is possible to impart a tensile strength of 1400 MPa or more to a steel member after forming by a hot stamping technique.

On the other hand, a goal of higher fuel economy is set in various countries around the world. Along with this, a reduction in the weight of the vehicle body has been examined, and higher strength is required for a steel member used for the vehicle body. For example, there is a need for a steel member that has a strength more than 1.5 GPa, which is the strength of a member generally used as a hot stamping member at present.

In addition, as described above, vehicles are also required to have collision safety. The collision safety of a vehicle is evaluated by the crushing strength and absorbed energy in a collision test of the entire vehicle body or some members. In particular, since the crushing strength largely depends on the material strength, the demand for ultrahigh strength steel members as vehicle members dramatically increases.

However, in general, the steel members decrease in fracture toughness and deformability with the high-strengthening. Therefore, the steel member is fractured prematurely during crushing due to a collision or is fractured at a portion on which deformation is likely to be concentrated, so that there are cases where crushing strength suitable for the material strength is not exhibited, and a sufficient absorbed energy cannot be obtained. Therefore, in order to improve the collision safety of vehicles, it is required to improve not only the material strength but also the fracture toughness and deformability, that is, the toughness and bendability of the steel members used.

When the steel member has a higher strength than that of a hot stamping member in the related art, specifically, a tensile strength of more than 1.5 GPa, the bendability and toughness are further deteriorated. Therefore, in order to apply a high strength steel member having a tensile strength of more than 1.5 GPa to a vehicle body, there is a need for a technique for providing a steel member having toughness and bendability higher than in the related art and exhibiting sufficient absorbed energy even in the event of a collision accident.

Regarding a high strength steel having a tensile strength of more than 1.5 GPa, for example, Patent Document 2 discloses a press-formed article having excellent toughness and a tensile strength of 1.8 GPa or more, which is hot press-formed. Patent Document 3 discloses a steel having a tensile strength as extremely high as 2.0 GPa or more, and further having good toughness and ductility. Patent Document 4 discloses a steel having a tensile strength as high as 1.8 GPa or more and further having good toughness. Patent Document 5 discloses a steel having a tensile strength as extremely high as 2.0 GPa or more and further having good toughness.

However, Patent Documents 2 to 5 do not describe techniques regarding bendability, and cannot sufficiently meet higher demands in the use of high strength steels having a tensile strength of more than 1.5 GPa as vehicle members in some cases.

Regarding bendability, for example, Patent Documents 6 to 10 disclose a hot-stamping formed body having excellent bendability. However, Patent Documents 6 to 10 do not describe techniques regarding toughness, and cannot sufficiently meet higher demands in the use of high strength steels having a tensile strength of more than 1.5 GPa as vehicle members in some cases.

PRIOR ART DOCUMENT

Patent Document

[Patent Document 1] Japanese Unexamined Patent Application, First Publication No. 2002-102980

[Patent Document 2] Japanese Unexamined Patent Application, First Publication No. 2012-180594

[Patent Document 3] Japanese Unexamined Patent Application, First Publication No. 2012-1802

[Patent Document 4] PCT International Publication No. WO2015/182596

[Patent Document 5] PCT International Publication No. WO2015/182591

[Patent Document 6] PCT International Publication No. WO2015/033177

[Patent Document 7] PCT International Publication No. WO2018/151333

[Patent Document 8] PCT International Publication No. WO2018/151330

[Patent Document 9] PCT International Publication No. WO2018/151332

[Patent Document 10] PCT International Publication No. WO2018/151325

DISCLOSURE OF THE INVENTION

Problems to be Solved by the Invention

The present invention has been made to solve the above problems, and an object thereof is to provide a coated steel member having high tensile strength and excellent toughness and bendability, a coated steel sheet suitable as a material for the steel member, and methods for producing the same.

Means for Solving the Problem

The gist of the present invention is a coated steel member, a coated steel sheet, and methods for producing the same as follows. Hereinafter, a steel sheet in which the surface is not subjected to a coating, which is a material of the coated steel sheet, is simply referred to as a "steel sheet".

(1) A coated steel member according to an aspect of the present invention includes: a steel sheet substrate containing, as a chemical composition, by mass %, C: 0.25% to 0.65%, Si: 0.10% to 2.00%, Mn: 0.30% to 3.00%, P: 0.050% or less, S: 0.0100% or less, N: 0.010% or less, Ti: 0.010% to 0.100%, B: 0.0005% to 0.0100%, Nb: 0.02% to 0.10%, Mo: 0% to 1.00%, Cu: 0% to 1.00%, Cr: 0% to 1.00%, Ni: 0% to 1.00%, V: 0% to 1.00%, Ca: 0% to 0.010%, Al: 0% to 1.00%, Sn: 0% to 1.00%, W: 0% to 1.00%, Sb: 0% to 1.00%, REM: 0% to 0.30%, and a remainder of Fe and impurities; and a coating formed on a surface of the steel sheet substrate and containing Al and Fe, in which the coating has a low Al content region having an Al content of 3 mass % or more and less than 30 mass % and a high Al content region formed on a side closer to a surface than the low Al content region and having an Al content of 30 mass % or more, a maximum C content of the high Al content region is 25% or less of a C content of the steel sheet substrate, a maximum C content of the low Al content region is 40% or less of the C content of the steel sheet substrate, and a maximum C content in a range from an interface between the steel sheet substrate and the coating to a depth of 10 μm on a side of the steel sheet substrate is 80% or less of the C content of the steel sheet substrate.

(2) In the coated steel member according to (1), the steel sheet substrate may contain, as the chemical composition, Cr: 0.05% to 1.00%, and a maximum Cr content in the high Al content region may be 80% or more of a Cr content of the steel sheet substrate.

(3) A coated steel sheet according to another aspect of the present invention includes: a steel sheet containing, as a chemical composition, by mass %, C: 0.25% to 0.65%, Si: 0.10% to 2.00%, Mn: 0.30% to 3.00%, P: 0.050% or less, S: 0.0100% or less, N: 0.010% or less, Ti: 0.010% to 0.100%, B: 0.0005% to 0.0100%, Nb: 0.02% to 0.10%, Mo: 0% to 1.00%, Cu: 0% to 1.00%, Cr: 0% to 1.00%, Ni: 0% to 1.00%, V: 0% to 1.00%, Ca: 0% to 0.010%, Al: 0% to 1.00%, Sn: 0% to 1.00%, W: 0% to 1.00%, Sb: 0% to 1.00%, REM: 0% to 0.30%, and a remainder of Fe and impurities; and a coating formed on a surface of the steel sheet and containing Al, in which the coating includes a lower layer being present on a side of the steel sheet and containing 3 mass % or more and less than 70 mass % of Al and an upper layer containing 70 mass % or more and 95 mass % or less of Al, the lower layer contains Cr in an amount of 1.2 times or more a Cr content in the steel sheet by mass %, or the upper layer contains Si and Ni in a total amount of 5.0 mass % or more and 30.0 mass % or less, and a maximum C content in a range from an interface between the steel sheet and the coating to a depth of 20 μm on a side of the steel sheet is 80% or less of an average C content in an overall sheet thickness of the steel sheet.

(4) In the coated steel sheet according to (3), the steel sheet may contain, as the chemical composition, Cr: 0.05% to 1.00%, and in the coating, the lower layer may contain Cr in an amount of 1.2 times or more the Cr content in the steel sheet, and the upper layer may contain Si and Ni in a total amount of 5.0 mass % or more and 30.0 mass % or less.

(5) A method for producing a coated steel sheet according to another aspect of the present invention, includes: a slab preparation step of melting a steel containing, as a chemical composition, by mass %, C: 0.25% to 0.65%, Si: 0.10% to 2.00%, Mn: 0.30% to 3.00%, P: 0.050% or less, S: 0.0100% or less, N: 0.010% or less, Ti: 0.010% to 0.100%, B: 0.0005% to 0.0100%, Nb: 0.02% to 0.10%, Mo: 0% to 1.00%, Cu: 0% to 1.00%, Cr: 0% to 1.00%, Ni: 0% to 1.00%, V: 0% to 1.00%, Ca: 0% to 0.010%, Al: 0% to 1.00%, Sn: 0% to 1.00%, W: 0% to 1.00%, Sb: 0% to 1.00%, REM: 0% to 0.30%, and a remainder of Fe and impurities, and casting to obtain a slab; a hot rolling step of hot-rolling the slab to obtain a hot-rolled steel sheet; a coiling step of coiling the hot-rolled steel sheet; a hot-rolled sheet annealing step of annealing the hot-rolled steel sheet after the coiling in an atmosphere containing 80% or more of nitrogen at 450° C. to 800° C. for 5 hours or longer; as necessary, a cold rolling step of descaling the hot-rolled steel sheet and cold-rolling the hot-rolled steel sheet to obtain a cold-rolled steel sheet; as necessary, an annealing step of annealing the hot-rolled steel sheet or the cold-rolled steel sheet to obtain an annealed steel sheet; and a coating step of forming an Al-based coating on the hot-rolled steel sheet, the cold-rolled steel sheet, or the annealed steel sheet to obtain a coated steel sheet.

(6) A method for producing a coated steel sheet according to another aspect of the present invention, includes: a slab preparation step of melting a steel containing, as a chemical composition, by mass %, C: 0.25% to 0.65%, Si: 0.10% to 2.00%, Mn: 0.30% to 3.00%, P: 0.050% or less, S: 0.0100% or less, N: 0.010% or less, Ti: 0.010% to 0.100%, B: 0.0005% to 0.0100%, Nb: 0.02% to 0.10%, Mo: 0% to 1.00%, Cu: 0% to 1.00%, Cr: 0% to 1.00%, Ni: 0% to 1.00%, V: 0% to 1.00%, Ca: 0% to 0.010%, Al: 0% to 1.00%, Sn: 0% to 1.00%, W: 0% to 1.00%, Sb: 0% to 1.00%, REM: 0% to 0.30%, and a remainder of Fe and impurities, and casting to obtain a slab; a hot rolling step of hot-rolling the slab to obtain a hot-rolled steel sheet; a coiling step of coiling the hot-rolled steel sheet; as necessary, annealing the hot-rolled steel sheet; as necessary, a cold rolling step of descaling the hot-rolled steel sheet and cold-rolling the hot-rolled steel sheet to obtain a cold-rolled steel sheet; an annealing step of annealing the hot-rolled steel sheet or the cold-rolled steel sheet to obtain an annealed steel sheet in an atmosphere having a dew point of 1° C. or higher and in a temperature range of 700° C. to 950° C.; and a coating step of forming an Al-based coating on a surface of the annealed steel sheet to obtain a coated steel sheet by immersing the annealed steel sheet in a plating bath containing Si and Ni in a total amount of 7.0 to 30.0 mass % and a remainder of Al and impurities.

(7) A method for producing a coated steel sheet according to another aspect of the present invention, includes: a slab preparation step of melting a steel containing, as a chemical composition, by mass %, C: 0.25% to 0.65%, Si: 0.10% to 2.00%, Mn: 0.30% to 3.00%, P: 0.050% or less, S: 0.0100% or less, N: 0.010% or less, Ti: 0.010% to 0.100%, B: 0.0005% to 0.0100%, Nb: 0.02% to 0.10%, Mo: 0% to 1.00%, Cu: 0% to 1.00%, Cr: 0% to 1.00%, Ni: 0% to 1.00%, V: 0% to 1.00%, Ca: 0% to 0.010%, Al: 0% to 1.00%, Sn: 0% to 1.00%, W: 0% to 1.00%, Sb: 0% to 1.00%, REM: 0% to 0.30%, and a remainder of Fe and impurities, and casting to obtain a slab; a hot rolling step of hot-rolling the slab to obtain a hot-rolled steel sheet; a coiling step of coiling the hot-rolled steel sheet; a hot-rolled sheet annealing step of annealing the hot-rolled steel sheet after the coiling in an atmosphere containing 80% or more of nitrogen at 450° C. to 800° C. for 5 hours or longer; as necessary, a cold rolling step of descaling the hot-rolled steel sheet and cold-rolling the hot-rolled steel sheet to obtain a cold-rolled steel sheet; an annealing step of annealing the hot-rolled steel sheet or the cold-rolled steel sheet to obtain an annealed steel sheet in an atmosphere having a dew point of 1° C. or higher and in a temperature range of 700° C. to 950° C.; and a coating step of forming an Al-based coating on a surface of the annealed steel sheet to obtain a coated steel sheet by immersing the annealed steel sheet in a plating bath containing Si and Ni in a total amount of 7.0 to 30.0 mass % and a remainder of Al and impurities.

(8) A method for producing a coated steel member according to another aspect of the present invention, includes: a slab preparation step of melting a steel containing, as a chemical composition, by mass %, C: 0.25% to 0.65%, Si: 0.10% to 2.00%, Mn: 0.30% to 3.00%, P: 0.050% or less, S: 0.0100% or less, N: 0.010% or less, Ti: 0.010% to 0.100%, B: 0.0005% to 0.0100%, Nb: 0.02% to 0.10%, Mo: 0% to 1.00%, Cu: 0% to 1.00%, Cr: 0% to 1.00%, Ni: 0% to 1.00%, V: 0% to 1.00%, Ca: 0% to 0.010%, Al: 0% to 1.00%, Sn: 0% to 1.00%, W: 0% to 1.00%, Sb: 0% to 1.00%, REM: 0% to 0.30%, and a remainder of Fe and impurities, and casting to obtain a slab; a hot rolling step of hot-rolling the slab to obtain a hot-rolled steel sheet; a coiling step of coiling the hot-rolled steel sheet; a hot-rolled sheet annealing step of annealing the hot-rolled steel sheet after the coiling in an atmosphere containing 80% or more of nitrogen at 450° C. to 800° C. for 5 hours or longer; as necessary, a cold rolling step of descaling the hot-rolled steel sheet and cold-rolling the hot-rolled steel sheet to obtain a cold-rolled steel sheet; as necessary, an annealing step of annealing the hot-rolled steel sheet or the cold-rolled steel sheet to obtain an annealed steel sheet; a coating step of forming an Al-based coating on the hot-rolled steel sheet, the cold-rolled steel sheet, or the annealed steel sheet to obtain a coated steel sheet; and a heat treatment step of heating the coated steel sheet to an $Ac_3$ point to ($Ac_3$ point+300°) C at a temperature rising rate of 1.0 to 1000° C./s, and thereafter cooling the coated steel sheet to an Ms point or lower at an upper critical cooling rate or more.

(9) A method for producing a coated steel member according to another aspect of the present invention, includes: a slab preparation step of melting a steel containing, as a chemical composition, by mass %, C: 0.25% to 0.65%, Si: 0.10% to 2.00%, Mn: 0.30% to 3.00%, P: 0.050% or less, S: 0.0100% or less, N: 0.010% or less, Ti: 0.010% to 0.100%, B: 0.0005% to 0.0100%, Nb: 0.02% to 0.10%, Mo: 0% to 1.00%, Cu: 0% to 1.00%, Cr: 0% to 1.00%, Ni: 0% to 1.00%, V: 0% to 1.00%, Ca: 0% to 0.010%, Al: 0% to 1.00%, Sn: 0% to 1.00%, W: 0% to 1.00%, Sb: 0% to 1.00%, REM: 0% to 0.30%, and a remainder of Fe and impurities, and casting to obtain a slab; a hot rolling step of hot-rolling the slab to obtain a hot-rolled steel sheet; a coiling step of coiling the hot-rolled steel sheet; as necessary, a hot-rolled sheet annealing step of annealing the hot-rolled steel sheet; as necessary, a cold rolling step of descaling the hot-rolled steel sheet and cold-rolling the hot-rolled steel sheet to obtain a cold-rolled steel sheet; an annealing step of annealing the hot-rolled steel sheet or the cold-rolled steel sheet to obtain an annealed steel sheet in an atmosphere having a dew point of 1° C. or higher and in a temperature range of 700° C. to 950° C.; a coating step of forming an Al-based coating on a surface of the annealed steel sheet to obtain a coated steel sheet by immersing the annealed steel sheet in a plating bath containing Si and Ni in a total amount of 7.0 to 30.0 mass % and a remainder of Al and impurities; and a heat treatment step of heating the coated steel sheet to an $Ac_3$ point to ($Ac_3$ point+300°) C at a temperature rising rate of 1.0 to 1000° C./s, and thereafter cooling the coated steel sheet to an Ms point or lower at an upper critical cooling rate or more.

(10) A method for producing a coated steel member according to another aspect of the present invention, includes: a slab preparation step of melting a steel containing, as a chemical composition, by mass %, C: 0.25% to 0.65%, Si: 0.10% to 2.00%, Mn: 0.30% to 3.00%, P: 0.050% or less, S: 0.0100% or less, N: 0.010% or less, Ti: 0.010% to 0.100%, B: 0.0005% to 0.0100%, Nb: 0.02% to 0.10%, Mo: 0% to 1.00%, Cu: 0% to 1.00%, Cr: 0% to 1.00%, Ni: 0% to 1.00%, V: 0% to 1.00%, Ca: 0% to 0.010%, Al: 0% to 1.00%, Sn: 0% to 1.00%, W: 0% to 1.00%, Sb: 0% to 1.00%, REM: 0% to 0.30%, and a remainder of Fe and impurities, and casting to obtain a slab; a hot rolling step of hot-rolling the slab to obtain a hot-rolled steel sheet; a coiling step of coiling the hot-rolled steel sheet; a hot-rolled sheet annealing step of annealing the hot-rolled steel sheet after the coiling in an atmosphere containing 80% or more of nitrogen at 450° C. to 800° C. for 5 hours or longer; as necessary, a cold rolling step of descaling the hot-rolled steel sheet and cold-rolling the hot-rolled steel sheet to obtain a cold-rolled steel sheet; an annealing step of annealing the hot-rolled steel sheet or the cold-rolled steel sheet to obtain an annealed steel sheet in an atmosphere having a dew point of 1° C. or higher and in a temperature range of 700° C. to 950° C.; a coating step of forming an Al-based coating on a surface of the annealed steel sheet to obtain a coated steel sheet by immersing the annealed steel sheet in a plating bath containing Si and Ni in a total amount of 7.0 to 30.0 mass % and a remainder of Al and impurities; and a heat treatment step of heating the coated steel sheet to an $Ac_3$ point to ($Ac_3$ point+300°) C at a temperature rising rate of 1.0 to 1000° C./s, and thereafter cooling the coated steel sheet to an Ms point or lower at an upper critical cooling rate or more.

Effects of the Invention

According to the above aspects of the present invention, it is possible to provide a coated steel member having high tensile strength and excellent toughness and bendability, a coated steel sheet, and methods for producing the same.

EMBODIMENTS OF THE INVENTION

Figure 1:
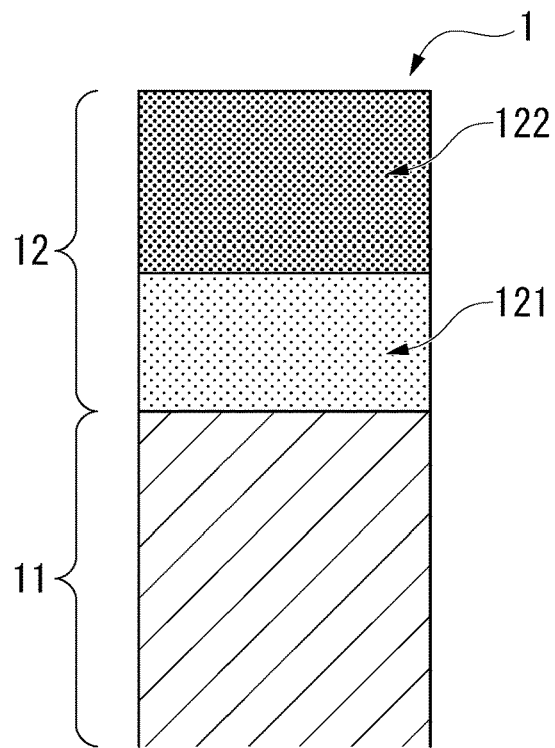
FIG. 1 is a schematic view showing an example of a coated steel member according to the present embodiment.

In order to obtain a coated steel member having high tensile strength and excellent toughness and bendability, the present inventors investigated the effect of chemical compositions and structures on these properties. As a result, the following findings were obtained.

Most of the steel sheets as materials for hot stamping members that are generally produced are coated steel sheets in which the surface is subjected to an aluminum plating (Al plating) or zinc plating (Zn plating) having excellent corrosion resistance. When hot stamping is performed on these coated steel sheets, the reaction of the alloy on the surface progresses, whereby a coated steel member having an Al—Fe-based coating or a Zn—Fe-based coating can be obtained. Most of the commonly used steel sheets showing a tensile strength of 1.5 GPa class after hot stamping have similar chemical compositions and contain about 0.20 mass % of C, and strength after the hot stamping is secured by C.

(a) In order to achieve a further reduction in the weight of the vehicle body, the present inventors conducted a detailed examination to obtain a high strength member exceeding 1.5 GPa after hot stamping by increasing the C content. As a result, it was found that by setting the C content to 0.25 mass % or more, an ultrahigh strength of 1.5 GPa or more in terms of tensile strength can be obtained after hot stamping. On the other hand, it was found that the bendability and toughness deteriorate with ultrahigh-strengthening for a tensile strength of 1.5 GPa or more. In particular, it was found that the bendability of the coated steel member is significantly lowered in a case where the coated steel sheet subjected to the Al-based coating as described above is used.

(b) The present inventors examined the effect of structures on the bendability of a coated steel sheet having an Al-based coating such as an Al plating. As a result, it was presumed that since the bendability is easily affected by the surface layer of a steel member, and an Al—Fe-based coating present on the surface layer of a coated steel member is hard, the bendability is deteriorated by the Al—Fe-based coating.

(c) The present inventors examined the relationship between the bendability and the surface layer structure of a coated steel member having an Al—Fe-based coating having a high strength of more than 1.5 GPa, and worked on improving the bendability. As a result, it was found that by reducing the C content unavoidably contained in the Al—Fe-based coating, it is possible to soften the Al—Fe-based coating and dramatically improve the bendability. In addition, it was found that C contained in the Fe—Al-based coating as described above is diffused from the steel sheet during a heat treatment, and by using a coated steel sheet in which the C content is reduced only in the surface layer area of the steel sheet in advance, it is possible to obtain a coated steel member having excellent bendability and strength.

(d) The present inventors further worked on improving the toughness of steel members in order to prevent premature fracture at the time of a collision. Refinement of the internal structure is effective for improving toughness, and by refining prior γ grains by precipitates of Nb—Ti—(C,N), it is possible to dramatically improve toughness.

However, as a result of the examinations by the present inventors, it was found that when Nb—Ti—(C,N) is precipitated inside the coated steel sheet, the diffusion of C in the steel sheet is promoted through the grain boundaries increased by the refinement, the C content in the Fe—Al-based coating cannot be sufficiently reduced, and there are cases where the bendability is lowered.

Therefore, the present inventors examined a method for improving toughness without lowering bendability. As a result, it was found that by refining prior γ grains through precipitation of precipitates of Nb—Ti—(C,N) in the steel sheet and simultaneously allowing Si or Ni that reduces the activity of C to be contained in the upper layer of the Al-based coating or allowing Cr that increases the activity of C to be concentrated in the lower layer of the Al-based coating, the diffusion of C from the steel sheet to the Fe—Al-based coating can be suppressed in the heat treatment, and as a result, it is possible to simultaneously improve toughness and bendability.

A coated steel member (coated steel member according to the present embodiment) and a coated steel sheet (coated steel sheet according to the present embodiment) according to an embodiment of the present invention, and methods for producing the same were obtained by the above findings. Each requirement will be described in detail below.

(A) Coated Steel Member

As shown in FIG. 1, a coated steel member 1 according to the present embodiment has a steel sheet substrate 11 having a predetermined chemical composition and a coating 12 formed on the surface of the steel sheet substrate 11 and containing Al and Fe.

In addition, the coating (Al—Fe-based coating) 12 has a high Al content region 122 having an Al content of 30 mass % or more and a low Al content region 121 having an Al content of 3 mass % or more and less than 30 mass %, the maximum C content of the high Al content region 122 is 25% or less of the C content of the steel sheet substrate 11, the maximum C content of the low Al content region 121 is 40% or less of the C content of the steel sheet substrate 11, and the maximum C content in a range from the interface between the steel sheet substrate 11 and the coating 12 to a depth of 10 μm on the steel sheet substrate 11 side is 80% or less with respect to an average C content of the steel sheet substrate 11 excluding the surface layer area.

In the coated steel member 1 according to the present embodiment, as shown in FIG. 1, the steel sheet substrate 11 side of the coating 12 is the low Al content region 121, and the surface side is the high Al content region 122.

(A1) Chemical Composition of Steel Sheet Substrate

The steel sheet substrate 11 of the coated steel member 1 according to the present embodiment has a predetermined chemical composition. Specifically, as the chemical composition, by mass %, C: 0.25% to 0.65%, Si: 0.10% to 2.00%, Mn: 0.30% to 3.00%, P: 0.050% or less, S: 0.0100% or less, N: 0.010% or less, Ti: 0.010% to 0.100%, B: 0.0005% to 0.0100%, Nb: 0.02% to 0.10%, Mo: 0% to 1.00%, Cu: 0% to 1.00%, Cr: 0% to 1.00%, Ni: 0% to 1.00%, V: 0% to 1.00%, Ca: 0% to 0.010%, Al: 0% to 1.00%, Sn: 0% to 1.00%, W: 0% to 1.00%, Sb: 0% to 1.00%, REM: 0% to 0.30%, and a remainder of Fe and impurities are included.

The reasons for limiting each element are as follows. Here, the chemical composition of the steel sheet substrate refers to the chemical composition of a part of the coated steel member excluding the Al—Fe-based coating of the surface and the surface layer structure of the steel sheet substrate. Hereinafter, % regarding the content is mass % unless otherwise specified.

C: 0.25% to 0.65%

C is an element that enhances the hardenability of steel and improves the strength of the coated steel member after hardening. However, when the C content is less than 0.25%, it becomes difficult to secure sufficient strength (more than 1.5 GPa) in the coated steel member after hardening. Therefore, the C content is set to 0.25% or more. The C content is preferably 0.28% or more.

On the other hand, when the C content exceeds 0.65%, the strength of the coated steel member after hardening becomes too high, and the deterioration of toughness and bendability becomes significant. Therefore, the C content is set to 0.65% or less. The C content is preferably 0.60% or less.

Si: 0.10% to 2.00%

Si is an element that is effective in enhancing the hardenability of steel and stably securing the strength after hardening. In order to obtain this effect, 0.10% or more of Si needs to be contained. The Si content is preferably 0.35% or more.

On the other hand, when the Si content in the steel exceeds 2.00%, a heating temperature required for austenitic transformation becomes significantly high during a heat treatment. This may lead to an increase in the cost required for the heat treatment. Furthermore, when the Si content exceeds 2.00%, the toughness of a hardened portion deteriorates. Therefore, the Si content is set to 2.00% or less. The Si content is preferably 1.60% or less.

Mn: 0.30% to 3.00%

Mn is a very effective element for enhancing the hardenability of steel and stably securing the strength after hardening. Mn is an element that further lowers an $Ac_3$ point and promotes the lowering of a hardening treatment temperature. Furthermore, Mn is an element having an effect of improving corrosion resistance by being diffused into the Al—Fe-based coating. When the Mn content is less than 0.30%, these effects are not sufficient, so that the Mn content is set to 0.30% or more. The Mn content is more preferably 0.40% or more.

On the other hand, when the Mn content exceeds 3.00%, the above effects are saturated, and the toughness and bendability of the hardened portion deteriorate. Therefore, the Mn content is set to 3.00% or less. The Mn content is preferably 2.80% or less, and more preferably 2.50% or less.

P: 0.050% or Less

P is an element that deteriorates the toughness of the coated steel member after hardening. In particular, when the P content exceeds 0.050%, the deterioration of toughness becomes significant. Therefore, the P content is limited to 0.050% or less. The P content is preferably limited to 0.005% or less. Since it is preferable that the P content is small, the P content may be 0%. However, the P content may be set to 0.0010% or more from the viewpoint of cost.

S: 0.0100% or Less

S is an element that deteriorates the toughness and bendability of the coated steel member after hardening. In particular, when the S content exceeds 0.0100%, the deterioration of the toughness and bendability becomes significant. Therefore, the S content is limited to 0.0100% or less. The S content is preferably limited to 0.0050% or less. Since it is preferable that the S content is small, the S content may be 0%. However, the S content may be set to 0.0001% or more from the viewpoint of cost.

N: 0.010% or Less

N is an element that deteriorates the toughness of the coated steel member after hardening. In particular, when the N content exceeds 0.010%, coarse nitrides are formed in the steel, and the toughness is significantly deteriorated. Therefore, the N content is set to 0.010% or less. The lower limit of the N content is not particularly limited and may be 0%. However, setting the N content to less than 0.0002% leads to an increase in steelmaking cost and is economically undesirable. Therefore, the N content may be set to 0.0002% or more, or 0.0008% or more.

Ti: 0.010% to 0.100%

Ti is an element having an action of suppressing recrystallization when the steel sheet is subjected to a heat treatment by being heated to a temperature of the $Ac_3$ point or higher, and suppressing grain growth by forming fine carbides, thereby refining austenite grains. Therefore, by including Ti, an effect of greatly improving the toughness of the coated steel member can be obtained. In addition, Ti is an element that suppresses the consumption of B due to the precipitation of BN by being preferentially bonded to N in the steel and promotes an effect of improving the hardenability by B, which will be described later. When the Ti content is less than 0.010%, the above effects cannot be sufficiently obtained. Therefore, the Ti content is set to 0.010% or more. The Ti content is preferably 0.015% or more.

On the other hand, when the Ti content exceeds 0.100%, the amount of TiC precipitated increases and C is consumed, resulting in a decrease in the strength of the coated steel member after hardening. Therefore, the Ti content is set to 0.100% or less. The Ti content is preferably 0.080% or less.

B: 0.0005% to 0.0100%

B has an action of dramatically improving the hardenability of steel even in a trace amount and is thus an important element. Furthermore, B is an element that strengthens the grain boundaries and enhances toughness by being segregated at the grain boundaries, and is an element that suppresses the growth of austenite grains when the steel sheet is heated. When the B content is less than 0.0005%, there are cases where the above effects cannot be sufficiently obtained. Therefore, the B content is set to 0.0005% or more. The B content is preferably 0.0010% or more.

On the other hand, when the B content exceeds 0.0100%, a large amount of coarse compounds are precipitated, and the toughness of the coated steel member deteriorates. Therefore, the B content is set to 0.0100% or less. The B content is preferably 0.0080% or less.

Nb: 0.02% to 0.10%

Nb has an action of forming fine carbides and increasing the toughness of steel due to the refining effect and is thus an important element. When the Nb content is less than 0.02%, there are cases where the above effects cannot be sufficiently obtained. Therefore, the Nb content is set to 0.02% or more. The Nb content is preferably 0.03% or more.

On the other hand, when the Nb content exceeds 0.10%, the carbides become coarse and the toughness of the coated steel member deteriorates. Therefore, the Nb content is set to 0.10% or less. The Nb content is preferably 0.08% or less.

In order to improve the strength, toughness, bendability, corrosion resistance, and deoxidation of the coated steel member according to the present embodiment, in addition to the above elements, one or more elements selected from Cr, Ni, Cu, Mo, V, Ca, Al, Nb, Sn, W, Sb, and REM described below may be contained. These elements are optional elements and do not necessarily have to be contained. Therefore, the lower limit thereof is 0%.

Cr: 0% to 1.00%

Cr increases the hardenability of steel, and is an effective element for stably securing the strength of the coated steel member after hardening. Therefore, Cr may be contained. Furthermore, Cr is an element having an effect of improving corrosion resistance by being diffused into the Al—Fe-based coating. In order to obtain the above effects, the Cr content is preferably 0.01% or more, more preferably 0.05% or more, and even more preferably 0.08% or more.

However, when the Cr content exceeds 1.00%, the above effects are saturated and the cost increases. Moreover, since Cr has an action of stabilizing iron carbides, when the Cr content exceeds 1.00%, there are cases where coarse iron carbides remain undissolved when the steel sheet is heated, and the toughness of the coated steel member after hardening deteriorates. Therefore, the Cr content when contained is set to 1.00% or less. The Cr content is preferably 0.80% or less.

Ni: 0% to 1.00%

Ni increases the hardenability of steel, and is an effective element for stably securing the strength of the coated steel member after hardening. Therefore, Ni may be contained. Furthermore, Ni is an element having an effect of improving corrosion resistance by being diffused into the Al—Fe-based coating. In order to obtain the above effects, Ni is contained preferably in an amount of 0.01% or more, and more preferably in an amount of 0.10% or more.

However, when the Ni content exceeds 1.00%, the above effects are saturated and the economic efficiency is lowered. Therefore, the Ni content when contained is set to 1.00% or less.

Cu: 0% to 1.00%

Cu increases the hardenability of steel, and is an effective element for stably securing the strength of the coated steel member after hardening. Therefore, Cu may be contained. Furthermore, Cu is an element having an effect of improving the corrosion resistance of the steel member. In order to obtain the above effects, the Cu content is preferably 0.01% or more, and more preferably 0.05% or more. However, when the Cr content exceeds 1.00%, the above effects are saturated and the cost increases. Therefore, the Cu content when contained is set to 1.00% or less. The Cu content is preferably 0.80% or less.

Mo: 0% to 1.00%

Mo increases the hardenability of steel, and is an effective element for stably securing the strength of the coated steel member after hardening. Therefore, Mo may be contained. Furthermore, Mo is an element having an effect of improving corrosion resistance by being diffused into the Al—Fe-based coating. In order to obtain the above effects, the Mo content is preferably 0.01% or more, and more preferably 0.05% or more.

However, when the Mo content exceeds 1.00%, the above effects are saturated and the cost increases. Moreover, since Mo has an action of stabilizing iron carbides, when the Mo content exceeds 1.00%, there are cases where coarse iron carbides remain undissolved when the steel sheet is heated, and the toughness of the coated steel member after hardening deteriorates. Therefore, the Mo content when contained is set to 1.00% or less. The Mo content is preferably 0.80% or less.

V: 0% to 1.00%

V is an element that forms fine carbides and increases toughness due to the refining effect. Therefore, V may be contained. In order to obtain the above effect, V is contained preferably in an amount of 0.01% or more, and more preferably in an amount of 0.10% or more.

However, when the V content exceeds 1.00%, the above effects are saturated and the economic efficiency is lowered. Therefore, the V content when contained is set to 1.00% or less.

Ca: 0% to 0.010%

Ca is an element having an effect of refining inclusions in steel and improving toughness after hardening. Therefore, Ca may be contained. In a case where the above effect is obtained, the Ca content is set to preferably 0.001% or more, and more preferably 0.002% or more.

However, when the Ca content exceeds 0.010%, the effect is saturated and the cost increases. Therefore, in a case where Ca is contained, the Ca content is set to 0.010% or less. The Ca content is preferably 0.005% or less, and more preferably 0.004% or less.

Al: 0% to 1.00%

Al is an element generally used as a steel deoxidizing agent. Therefore, Al may be contained. In order to obtain the above effect, Al is preferably contained in an amount of 0.01% or more.

However, when the Al content exceeds 1.00%, the above effect is saturated and the economic efficiency is lowered. Therefore, the Al content when contained is set to 1.00% or less.

Sn: 0% to 1.00%

Sn is an element that improves corrosion resistance in a corrosive environment. Therefore, Sn may be contained. In order to obtain the above effect, Sn is preferably contained in an amount of 0.01% or more.

However, when the Sn content exceeds 1.00%, the grain boundary strength decreases, and the toughness of the coated steel member after hardening deteriorates. Therefore, the Sn content when contained is set to 1.00% or less.

W: 0% to 1.00%

W is an element that makes it possible to increase the hardenability of steel and stably secure the strength of the coated steel member after hardening. Therefore, W may be contained. Furthermore, W is an element that improves corrosion resistance in a corrosive environment. In order to obtain the above effects, W is preferably contained in an amount of 0.01% or more.

However, when the W content exceeds 1.00%, the above effects are saturated and the economic efficiency is lowered. Therefore, the W content when contained is set to 1.00% or less.

Sb: 0% to 1.00%

Sb is an element that improves corrosion resistance in a corrosive environment. Therefore, Sb may be contained. In order to obtain the above effect, the Sb content is preferably set to 0.01% or more.

However, when the Sb content exceeds 1.00%, the grain boundary strength decreases, and the toughness of the coated steel member after hardening deteriorates. Therefore, the Sb content when contained is set to 1.00% or less.

REM: 0% to 0.30%

Like Ca, REM is an element having an effect of refining inclusions in steel and improving the toughness of the coated steel member after hardening. Therefore, REM may be contained. In a case where the above effect is desired, the REM content is set to preferably 0.01% or more, and more preferably 0.02% or more.

However, when the REM content exceeds 0.30%, the effect is saturated and the cost increases. Therefore, the REM content when contained is set to 0.30% or less. The REM content is preferably 0.20% or less.

Here, REM refers to a total of 17 elements of Sc, Y, and lanthanoids such as La and Nd, and the REM content means the total amount of these elements. REM is added to molten steel using, for example, an Fe—Si-REM alloy, and this alloy contains, for example, La, Nd, Ce, Pr.

In the chemical composition of the coated steel member of the present embodiment, the remainder other than the elements described above consists of Fe and impurities.

Here, the "impurities" are elements that are incorporated due to various factors including raw materials such as ore and scrap and the production process when the steel sheet is industrially produced, and are acceptable in a range without adversely affecting the properties of the coated steel member according to the present embodiment.

The chemical composition of the steel sheet substrate can be obtained by the following method.

The chemical composition of the steel sheet substrate is obtained by cutting out an analysis sample from the steel sheet substrate and performing elemental analysis such as inductively coupled plasma (ICP) atomic emission spectrometry. The analysis sample is collected so as to obtain an average chemical composition of the overall sheet thickness of the steel sheet substrate, as described in JIS G 0417. Specifically, the analysis sample is collected from a thickness ¼ position in the sheet thickness direction from the surface of the steel sheet substrate, avoiding width direction end portions of the coated steel member.

The average C content and average Cr content excluding the surface layer area of the steel sheet substrate are the values obtained from the above ICP atomic emission spectrometry.

(A2) Coating

The coated steel member 1 according to the present embodiment has the coating 12 containing Al and Fe (hereinafter, Al—Fe-based coating) on the surface of the steel sheet substrate 11 described above. In the present embodiment, the Al—Fe-based coating 12 is a coating primarily containing Al and Fe, and preferably contains Al and Fe in a total amount of 70% or more. In addition, the Al—Fe-based coating 12 is also referred to as a film, an alloy plating layer, or an intermetallic compound layer. The Al—Fe-based coating 12 further contains Si, Mg, Ca, Ni, Cu, Mn, Cr, Mo, Sn, Sr, C, and the like, and the remainder may be impurities.

The coating (Al—Fe-based coating 12) included in the coated steel member 1 according to the present embodiment has the high Al content region 122 having an Al content of 30 mass % or more and the low Al content region 121 having an Al content of 3 mass % or more and less than 30 mass %. In addition, the maximum C content of the high Al content region 122 is 25% or less of the C content of the steel sheet substrate 11, and the maximum C content of the low Al content region 121 is 40% or less of the C content of the steel sheet substrate 11.

The kind of coating is not limited. For example, the coating is a coating formed by hot-dip plating, electro plating, thermal spraying, or the like.

The thickness of the Al—Fe-based coating is preferably 5 to 50 μm.

By controlling the Al—Fe-based coating 12 as described above, the bendability of the coated steel member 1 is improved. When the maximum C content of the high Al content region 122 exceeds 25% of the C content (average C content in the steel sheet substrate) contained in the steel sheet substrate 11, and/or the maximum C content of the low Al content region 121 exceeds 40% of the C content in the steel sheet substrate 11, there are cases where the bendability is not sufficient and energy cannot be sufficiently absorbed at the time of a collision. The lower limit of the C content in the high Al content region 122 or the C content in the low Al content region 121 is not particularly specified, but may be about 0.1% of the C content in the steel sheet substrate 11.

The maximum C content in the Al—Fe-based coating 12 can be obtained as follows.

The maximum C contents of the high Al content region 122 and the low Al content region 121 are obtained by performing glow discharge emission analysis (GDS) on the coating in the thickness direction from the surface of the coated steel member 1. Specifically, glow discharge emission analysis (GDS) is performed at an approximately ¼ position of width (short direction) from the width direction end portion of the coated steel member 1 in the sheet thickness direction from the surface of the coated steel member 1 to obtain the maximum C content in a range where the Al content is 30 mass % or more, and the maximum C content in a range where the Al content is 3 mass % or more and less than 30 mass %. This measurement is performed a total of five times, and the average value of the maximum C contents obtained in each measurement is determined to be the maximum C content of the high Al content region 122 and the maximum C content in the low Al content region 121.

In the present embodiment, the Al—Fe-based coating 12 is a region where the Fe content is less than 95% when measured by GDS from the surface of the coated steel member.

The maximum Cr content in the high Al content region is preferably 80% or more of the Cr content of the steel sheet substrate (average Cr content in the steel sheet substrate). In this case, an effect of improving the corrosion resistance of the coated steel member can be obtained.

The maximum Cr content in the high Al content region 122 is determined by performing glow discharge emission analysis (GDS) on the coating in the thickness direction from the surface of the coated steel member in the same manner as the maximum C content.

(A3) Surface Layer Structure of Steel Sheet Substrate

In the coated steel member 1 according to the present embodiment, the maximum C content in a range from the surface of the steel sheet substrate 11 (the interface with the steel sheet substrate 11 and the coating 12) to a depth of 10 μm (a range from the interface to 10 μm on the steel sheet substrate side, so-called surface layer structure of the steel sheet substrate) is 80% or less of the C content (average C content) of the steel sheet substrate 11.

The maximum C content in the range from the interface between the steel sheet substrate 11 and the coating 12 to the depth of 10 μm on the steel sheet substrate 11 side is obtained by performing glow discharge emission analysis (GDS) in the sheet thickness direction from the surface of the coated steel member 1. Specifically, glow discharge emission analysis (GDS) is performed at an approximately ¼ position of width (short direction) from the width direction end portion of the coated steel member 1 in the sheet thickness direction from the surface of the coated steel member 1 to determine a region where the Fe content is less than 95 mass % to be the Al—Fe-based coating 12, and determine a region where the Fe content is 95 mass % or more to be the steel sheet substrate 11. In the steel sheet substrate 11, the maximum C content in the range from the interface between the Al—Fe-based coating 12 and the steel sheet substrate 11 to a depth of 10 μm is obtained. This measurement is performed five times, and the average value of the maximum C contents obtained in each measurement is determined to be the maximum C content in the range from the surface of the steel sheet substrate to the depth of 10 μm.

(A4) Internal Structure of Steel Sheet Substrate

The internal structure of the steel sheet substrate 11 of the coated steel member 1 according to the present embodiment is a structure primarily containing martensite and bainite, which have high strength. In terms of area fraction, the sum of martensite and bainite is preferably 90% or more, the sum of the martensite and bainite is more preferably 90% or more, and martensite occupies 70% or more in terms of area fraction. More preferably, martensite occupies 80% or more. The internal structure of the steel sheet substrate 11 is the structure of a region excluding the surface layer structure (10 μm from the surface) of the steel sheet substrate 11 described above.

The internal structure of the steel sheet substrate 11 may contain residual austenite, bainite, ferrite, or pearlite as the remainder other than martensite and bainite. Martensite includes not only so-called fresh martensite but also tempered martensite and auto-tempered martensite. The auto-tempered martensite is tempered martensite generated during cooling at the time of hardening without a heat treatment for tempering, and is generated by in-situ tempering of martensite generated due to self-heating associated with martensitic transformation.

The internal structure of the steel sheet substrate can be determined by the following method.

The total area fraction of martensite (including tempered martensite and auto-tempered martensite) and bainite is obtained by an X-ray diffraction method. Specifically, a measurement sample is cut out from a ¼ position of width from the width direction end portion of the steel member and used as a sample for X-ray diffraction. This sample is chemically polished from the surface of the steel sheet substrate to a thickness ¼ depth using hydrofluoric acid and hydrogen peroxide solution. The polished sample is subjected to X-ray diffraction in a 2θ range of 450 to 1050 using a Co tube bulb as a measurement condition. The diffracted X-ray intensities of a body-centered cubic lattice (martensite and bainite) and a face-centered cubic lattice (residual austenite) included in the steel member are measured, the total volume fraction of martensite and bainite and the volume fraction of residual austenite are obtained from the area ratio of the diffraction curve. Since the steel member of the present embodiment has an isotropy metallographic structure, the values of the volume fractions can be directly replaced into area fractions. Accordingly, the total area fraction of martensite and bainite is obtained. Ferrite or pearlite in the body-centered cubic lattice in a case of being mixed can be easily identified by an optical microscope or a scanning microscope described later.

In a case where the area fractions of martensite and bainite are separately measured, the measurement is performed by a transmission electron microscope (TEM) and an electron beam diffractometer attached to the TEM. A measurement sample is cut out from a ¼ position of the width of the steel member or a ¼ position of the thickness of the steel sheet substrate to be used as a thin film sample for TEM observation. As the thin film sample, a sample cut out from a cross section in the direction perpendicular to a rolling direction is used. The range of TEM observation is set to a range of 400 μm² in terms of area. The electron beam diffraction pattern of the thin film sample makes it possible to distinguish between martensite and bainite, which are body-centered cubic lattices, and residual austenite, which is a face-centered cubic lattice. Iron carbides ($Fe_3C$) in martensite and bainite are found by the diffraction pattern, and the precipitation morphology thereof is observed to separate martensite and bainite from each other and measure the microstructural fractions thereof. Specifically, regarding the precipitation morphology, precipitation with three orientations is determined to be martensite, and precipitation limited to one orientation is determined to be bainite. Carbides are observed to distinguish between martensite and bainite, but in the present embodiment, carbides are not included in the volume fraction of the structure.

Ferrite or pearlite that may be present as the remainder in microstructure can be easily confirmed with an optical microscope or a scanning electron microscope. Specifically, a measurement sample is cut out from the ¼ position of the width of the steel member and the ¼ position of the thickness of the steel sheet substrate to be used as a sample for observation. As the sample, a sample cut out from a cross section in the direction perpendicular to the rolling direction is used. The observation range of the microscope is set to a range of 40,000 μm² in terms of area. The cut sample is mechanically polished and then mirror-finished. Next, etching is performed with a nital etching solution to reveal ferrite and pearlite, and this is observed with the microscope to confirm the presence of ferrite or pearlite. A structure in which ferrite and cementite are alternately arranged in layers is determined to be pearlite, and a structure in which cementite is precipitated in particles is determined to be bainite.

(A5) Properties of Coated Steel Member

In the coated steel member 1 according to the present embodiment, the steel sheet substrate 11 and the coating 12 are controlled as described above, so that the Al—Fe-based coating 12 is softened and the bendability at the time of a collision is improved. In addition, the coated steel member 1 according to the present embodiment has not only excellent bendability but also a tensile strength as high as more than 1.5 GPa, and also has excellent toughness.

In the present embodiment, the bendability is evaluated by a collision test or a bending test of the coated steel member. For example, a bending test piece is cut out from the coated steel member, a bending test is performed in accordance with VDA standard 238-100, and the bendability is evaluated by the bending angle at the maximum load.

In the coated steel member 1 according to the present embodiment, it is possible to obtain excellent bendability with a bending angle of 60 degrees or more at the maximum load in a case where the tensile strength is more than 1.5 GPa to 2.1 GPa and with a bending angle of 50 degrees or more in a case where the tensile strength is more than 2.1 GPa.

In addition, in the present embodiment, the toughness is evaluated by a collision test or a Charpy impact test of the coated steel member. For example, a V-notch Charpy impact test piece having a size of sheet thickness×10 mm×55 mm is cut out from the steel member, and a Charpy impact test is performed in accordance with JIS Z 2242:2018 to evaluate the toughness by an impact value at −40° C.

In the coated steel member according to the present embodiment, it is possible to obtain excellent toughness with an impact value of 35 J/cm² or more in a case where the tensile strength is more than 1.5 GPa to 2.1 GPa and with an impact value of 20 J/cm² or more in a case where the tensile strength is more than 2.1 GPa.

The shape of the coated steel member is not particularly limited. That is, the shape thereof may be a flat sheet or a formed body. A hot-formed coated steel member is often a formed body, and in the present embodiment, a case of a formed body and a case of a flat sheet are collectively referred to as a "coated steel member".

(B) Coated Steel Sheet

Next, a coated steel sheet 2 according to the present embodiment will be described. The coated steel sheet 2 according to the present embodiment is suitable as a material for the coated steel member 1 according to the above-described embodiment.

Figure 2:
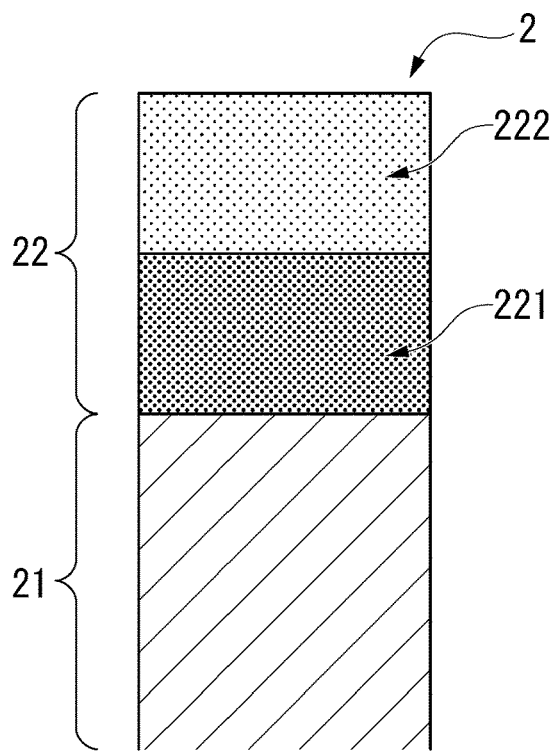
FIG. 2 is a schematic view showing an example of a coated steel sheet according to the present embodiment.

As shown in FIG. 2, the coated steel sheet 2 according to the present embodiment has a steel sheet 21 having a predetermined chemical composition and a coating (Al-based coating) 22 formed on the surface of the steel sheet 21 and containing Al. In addition, the Al-based coating is provided on the steel sheet side, and includes a lower layer 221 containing 3 mass % or more and less than 70 mass % of Al, and an upper layer 222 containing 70 mass % or more and 95 mass % or less of Al. Furthermore, the Al-based coating 22 satisfies any of (i) and (ii) below. Preferably, both (i) and (ii) are satisfied.

(i) The lower layer 221 contains Cr in an amount of 1.2 times or more the Cr content in the steel sheet 21 by mass %. (ii) The upper layer 222 contains Si and Ni in a total amount of 5.0 mass % or more and 30.0 mass % or less.

Furthermore, in the coated steel sheet 2 according to the present embodiment, in the steel sheet 21, the maximum C content in a range from the interface between the steel sheet 21 and the Al-based coating 22 to a depth of 20 μm on the steel sheet 21 side (surface layer structure of the steel sheet 21) is 80% or less of the average C content excluding the surface layer area of the steel sheet 21.

(B1) Chemical Composition of Steel Sheet

The chemical composition of the steel sheet 21 included in the coated steel sheet 2 is the same as the chemical composition of the steel sheet substrate 11 in the coated steel member 1 described above, and the reason for its limitation is also the same. Here, the chemical composition of the steel sheet 21 refers to the chemical composition of a part of the coated steel sheet 2 excluding the Al-based coating 22 of the surface and the surface layer structure of the steel sheet 21, and is obtained by performing elemental analysis such as inductively coupled plasma (ICP) atomic emission spectrometry at a thickness ¼ position from the surface in the sheet thickness direction of the steel sheet. The average C content and average Cr content excluding the surface layer area of the steel sheet are values obtained from the above ICP atomic emission spectrometry.

(B2) Coating

The coated steel sheet 2 according to the present embodiment has the Al-containing coating (hereinafter, Al-based coating) 22 on the surface of the steel sheet 21. The Al-based coating 22 has the lower layer 221 containing 3 mass % or more and less than 70 mass % of Al on the steel sheet 21 side of the coated steel sheet 2, and the upper layer 222 containing 70 mass % or more and 95 mass % or less of Al on the surface side of the coated steel sheet 2. The Al-based coating is a coating primarily containing Al. For example, to an Al-based coating containing 3% or more of Al, as additive elements, Mg, Ti, Zn, Sb, Sn, Cu, Co, In, Bi, Ca, Sr, mischmetal, and the like may be added.

The upper layer 222 preferably contains Si and Ni in a total amount of 5.0 mass % or more and 30.0 mass % or less. Si and Ni contained in the upper layer 222 of the Al-based coating 22 are elements that lower the activity of C, and when the maximum total amount of Si and Ni in the upper layer 222 is 5.0 mass % or more, an effect of suppressing the diffusion of C from the steel sheet to the Al—Fe-based coating (particularly to the surface side of the Al—Fe-based coating) can be obtained in a heat treatment described later. When the maximum total amount of Si and Ni is less than 5.0 mass %, there are cases where the C content in the Al—Fe-based coating 12 when a heat treatment is performed to obtain the coated steel member 1 increases. In this case, the bendability is not sufficient, and energy cannot be sufficiently absorbed at the time of a collision. Therefore, the total amount of Si and Ni in the upper layer 222 is preferably set to 5.0 mass % or more.

Cr is an element that increases the activity of C. Therefore, when Cr is contained in the lower layer 221 present on the steel sheet 21 side of the Al-based coating 22, there is an effect of suppressing the diffusion of C into the Al—Fe-based coating in the heat treatment described later. Therefore, the lower layer 221 preferably contains Cr.

Furthermore, by including Cr in the lower layer 221, Cr can also be contained in the high Al content region 122 when the coated steel member 1 is obtained.

In a case where the above effect is obtained, it is preferable that the steel sheet 21 contains 0.05% or more of Cr, and the maximum value of the Cr content in the lower layer 221 is 1.2 times or more (120% or more) the Cr content (average Cr content) in the steel sheet 21. More preferably, the steel sheet 21 contains 0.08% or more of Cr, and the maximum value of the Cr content in the lower layer 221 is 1.2 times or more (120% or more) the Cr content in the steel sheet 21.

When the maximum value of the Cr content in the lower layer 221 is less than 120% of the Cr content of the steel sheet 21, the effect of suppressing the diffusion of C into the Al—Fe-based coating 12 is small. The lower limit of the Cr content in the lower layer 221 is not particularly specified, but may be about 0.01% in a case where the steel sheet 21 contains Cr.

In the coated steel sheet 2 according to the present embodiment, in order to suppress the diffusion of C into the Al—Fe-based coating 12 after the heat treatment, the upper layer 222 needs to contain Si and Ni in a total amount of 5.0 mass % or more and 30.0 mass % or less, or the lower layer 221 needs to contain Cr in an amount of 1.2 times or more the Cr content in the steel sheet by mass %. The diffusion of C can be suppressed as long as at least one thereof is satisfied. In a case of obtaining a higher effect, it is preferable to satisfy both.

The maximum values of the total amount of Si and Ni of the upper layer 222 and the Cr content of the lower layer 221 in the Al-based coating 22 are obtained by performing glow discharge emission analysis (GDS) in the sheet thickness direction from the surface of the coated steel sheet 2 as follows.

When obtaining the maximum values of the total amount of Si and Ni of the upper layer 222 and the Cr content of the lower layer 221, a region where the Al content is 3 mass % or more and the Fe content is less than 95 mass % is determined to be the Al-based coating 22, and a region where the Fe content is 95 mass % or more is determined to be the steel sheet 21. Furthermore, in the Al-based coating 22, a region where the Al content is 70 mass % or more is determined to be the upper layer 222, and a region where the Al content is less than 70% is determined to be lower layer 221.

Specifically, glow discharge emission analysis (GDS) is performed at an approximately ¼ position of width (short direction) from the width direction end portion of the coated steel member in the sheet thickness direction from the surface of the coated steel sheet to obtain the Si content and the Ni content in the upper layer, and the sum of the Si content and the Ni content at a position where the total content is the largest is used as the total amount of Si and Ni of the upper layer in the upper layer.

Furthermore, glow discharge emission analysis (GDS) is performed at an approximately ¼ position of width (short direction) from the width direction end portion of the coated steel member in the sheet thickness direction from the surface of the coated steel sheet to measure the maximum value of the Cr content in the lower layer.

This measurement is performed a total of five times, and the values obtained in each measurement are averaged to obtain the maximum values of the total amount of Si and Ni of the upper layer and the Cr content of the lower layer.

(B3) Surface Layer Structure of Steel Sheet

In the coated steel sheet 2 according to the present embodiment, the maximum C content in the range (surface layer structure of the steel sheet 21) from the surface of the steel sheet 21 (the interface between the steel sheet 21 and the coating 22) to a depth of 20 μm is 80% or less of the C content (average C content) of the steel sheet 21.

When the maximum C content in the surface layer structure of the steel sheet 21 exceeds 80% of the C content of the steel sheet 21, the C content in the Al—Fe-based coating 12 of the coated steel member 1 after the heat treatment becomes high. In this case, there are cases where the bendability is not sufficient, and energy is not sufficiently absorbed at the time of a collision. The lower limit of the maximum C content in the range from the surface of the steel sheet 21 to the depth of 20 μm is not particularly specified, but may be about 0.01% in total.

The C content in the steel sheet 21 can be obtained as follows.

The maximum C content in the range from the surface of the steel sheet 21 to the depth of 20 μm is obtained by performing glow discharge emission analysis (GDS) in the sheet thickness direction from the surface of the coated steel sheet 2. Specifically, glow discharge emission analysis (GDS) is performed at an approximately ¼ position of width (short direction) from the width direction end portion of the coated steel sheet 2 in the sheet thickness direction from the surface of the coated steel sheet 2 to determine a region where the Fe content is less than 95 mass % to be the Al-based coating 22, and determine a region where the Fe content is 95 mass % or more to be the steel sheet 21. In the steel sheet 21, the maximum C content in the range from the interface between the Al-based coating 22 and the steel sheet substrate 21 to a depth of 20 μm is obtained. This measurement is performed five times, and the average value of the maximum C contents obtained in each measurement is determined to be the maximum C content in the range from the surface of the steel sheet to the depth of 20 μm.

(B4) Internal Structure of Steel Sheet

The internal structure of the steel sheet 21 included in the coated steel sheet 2 according to the present embodiment is not limited, but is often ferrite or pearlite. In the conditions of a production method described later, bainite, martensite, and residual austenite may be contained. The martensite includes not only so-called fresh martensite but also tempered martensite and auto-tempered martensite. The auto-tempered martensite is tempered martensite generated during cooling at the time of hardening without a heat treatment for tempering, and is generated by in-situ tempering of martensite generated due to heating associated with martensitic transformation. The internal structure of the steel sheet is a structure excluding the above-mentioned surface layer structure.

Next, a method for producing the coated steel sheet 2 and the coated steel member 1 will be described.

(C) Method for Producing Coated Steel Sheet

The coated steel sheet 2 according to the present embodiment can be manufactured by using a production method I or a production method II including the following steps. The production method I and the production method II may be performed in combination (for example, performed so as to include steps (i)+(ii)+(iii)+(iv)+(v)+(vi)'+(vii)').

Production Method I (i) A slab preparation step of melting and casting a steel having the above-mentioned chemical composition.

(ii) A hot rolling step of hot-rolling the obtained slab to obtain a hot-rolled steel sheet.

(iii) A coiling step of coiling the hot-rolled steel sheet.

(iv) A hot-rolled sheet annealing step of annealing the hot-rolled steel sheet after the coiling step in an atmosphere containing 80% or more of nitrogen at 450° C. to 800° C. for 5 hours or longer.

(v) A cold rolling step of descaling the hot-rolled steel sheet after the hot-rolled sheet annealing step as necessary, and cold-rolling the hot-rolled steel sheet to obtain a cold-rolled steel sheet.

(vi) An annealing step of annealing the hot-rolled steel sheet or the cold-rolled steel sheet to obtain an annealed steel sheet as necessary.

(vii) A coating step of forming an Al-based coating on the hot-rolled steel sheet, the cold-rolled steel sheet, or the annealed steel sheet to obtain a coated steel sheet.

Production Method II (i) A slab preparation step of melting and casting a steel having the above-mentioned chemical composition to obtain a slab.

(ii) A hot rolling step of hot-rolling the obtained slab to obtain a hot-rolled steel sheet.

(iii) A coiling step of coiling the hot-rolled steel sheet.

(iv)' A hot-rolled sheet annealing step of performing hot-rolled sheet annealing on the hot-rolled steel sheet as necessary.

(v) A cold rolling step of descaling the hot-rolled steel sheet as necessary, and cold-rolling the hot-rolled steel sheet to obtain a cold-rolled steel sheet.

(vi)' An annealing step of annealing the hot-rolled steel sheet or the cold-rolled steel sheet to obtain an annealed steel sheet in an atmosphere having a dew point of 1° C. or higher and in a temperature range of 700° C. to 950° C.

(vii)' A coating step of forming an Al-based coating on the surface of the annealed steel sheet to obtain a coated steel sheet by immersing the annealed steel sheet in a plating bath containing Si and Ni in a total amount of 7.0 to 30.0 mass % and a remainder of Al and impurities.

Hereinafter, each step will be described.

<Slab Preparation Step>

In the slab preparation step, a steel having the above-mentioned chemical composition is melted and cast to produce a slab to be subjected to hot rolling. For example, a slab produced by melting molten steel having the above chemical composition using a converter or an electric furnace and performing a continuous casting method thereon can be used. Instead of the continuous casting method, an ingot-making method, a thin slab casting method, or the like may be adopted.

<Hot Rolling Step>

In the hot rolling step, the slab is heated, subjected to rough rolling, then subjected to descaling as necessary, and finally subjected to finish rolling. The hot rolling conditions are not limited.

<Coiling Step>

In the coiling step, for example, the hot-rolled steel sheet after the hot rolling is coiled in a temperature range of 800° C. or lower. When the coiling temperature exceeds 800° C., the hot-rolled steel sheet is coiled while transformation hardly progresses and the transformation progresses in the coil, so that there are cases where the coil shape is defective.

<Hot-Rolled Sheet Annealing Step>

In a case where the Cr content in the region (lower layer) containing 3 mass % or more and less than 70 mass % of Al is set to 120% or more of the Cr content in the steel sheet, in the annealing step of the hot-rolled steel sheet, annealing is performed in an atmosphere containing 80 vol % or more of nitrogen at 450° C. to 800° C. for 5 hours or longer.

Cr is concentrated on the surface layer of the steel sheet by annealing in a non-oxidizing atmosphere. Specifically, by setting the atmosphere to an atmosphere containing 80% or more of a neutral or inert gas such as nitrogen, and performing annealing in a temperature range of 450° C. to 800° C. for 5 hours or longer, the Cr content in the lower layer of the Al-based coating can be 1.2 times (120%) or more the Cr content in the steel sheet. Nitrogen is desirable as the neutral or inert gas from the viewpoint of cost, but argon, helium, or the like may be used. When the annealing atmosphere contains the neutral or inert gas in an amount of less than 80% and/or the retention time is shorter than 5 hours, there are cases where the Cr content in the lower layer of the Al-based coating is less than 120% of the Cr content in the steel sheet. The upper limit of the annealing time is not particularly set, but 48 hours or longer is not preferable because the cost may become excessive. When the annealing temperature is lower than 450° C., there are cases where the Cr content in the lower layer is less than 120% of the Cr content in the steel sheet, which is not preferable. When the annealing temperature exceeds 800° C., the cost of the heat treatment becomes excessive, which is not preferable.

In addition, by performing hot-rolled sheet annealing under the above conditions, the maximum C content in the range from the surface of the steel sheet to the depth of 20 μm can be 80% or less of the C content (average content) of the steel sheet.

In a case of performing this hot-rolled sheet annealing step, the hot-rolled sheet annealing step needs to be performed on the hot-rolled steel sheet in the black-skinned state in which pickling or the like is not performed (a state where iron scale consisting of FeO, $Fe_2O_3$, $Fe_3O_4$, and the like is formed on the surface). By performing annealing on the black-skinned hot-rolled steel sheet under the above conditions, a CO desorption reaction on the surface of the steel sheet due to the reduction of iron scale, that is, decarburization progresses, and the Cr content and C content can be controlled to desirable ranges.

<Cold Rolling Step>

In the cold rolling step, the hot-rolled steel sheet after the hot-rolled sheet annealing step (in a case where the hot-rolled sheet annealing step is not performed, the hot-rolled steel sheet after the coiling step) is subjected to descaling and cold-rolled to obtain a cold-rolled steel sheet. Descaling and cold rolling do not necessarily have to be performed. However, in a case where cold rolling is performed, the cumulative rolling reduction rolling reduction in the cold rolling is preferably set to 30% or more from the viewpoint of securing good flatness. On the other hand, in order to prevent the load from becoming excessive, the cumulative rolling reduction rolling reduction in the cold rolling is preferably set to 80% or less.

The descaling method is not particularly limited, but pickling is preferable. In a case where pickling is performed, it is preferable to remove only the iron scale by pickling with hydrochloric acid or sulfuric acid as for the conditions. By performing pickling under these conditions, a Cr-enriched layer is likely to remain.

<Annealing Step>

In order to set the maximum C content in the range from the surface of the steel sheet to the depth of 20 μm to 80% or less of the C content of the steel sheet, the hot-rolled steel sheet or the cold-rolled steel sheet is annealed in a wet hydrogen atmosphere having a dew point of 1° C. or higher and in a temperature range of 700° C. to 950° C. For example, in a two-stage heating furnace of a direct fired burner and a radiant tube, the steel sheet is heated to 560° C. to 650° C. with an air-fuel ratio of 0.9 to 1.2, and heated to 700° C. to 950° C. in an atmosphere having a hydrogen concentration of 1% to 13% and a dew point of 1° C. or higher. A preferable dew point is 3° C. or higher, and a more preferable dew point is 5° C. or higher. It is desirable to hold the steel sheet in a high dew point atmosphere containing hydrogen at 700° C. or higher for 30 seconds or longer. By performing annealing under the above conditions, a CO desorption reaction of the steel sheet surface due to the reduction of moisture in the atmosphere progresses, and the maximum C content in the range from the surface of the steel sheet to the depth of 20 μm can be 80% or less of the C content of the steel sheet. When the dew point exceeds +20° C., an internal oxidation of easily oxidizable elements such as Si and Mn of the steel sheet progresses excessively, and there are cases where the weldability and the quality of the surface layer of the steel sheet deteriorate. In addition, the cost becomes excessive. Therefore, the dew point is preferably +20° C. or lower.

However, since the same effect can be obtained by the above-mentioned hot-rolled sheet annealing, this annealing step may be omitted in the case where the hot-rolled sheet annealing is performed or may be performed under conditions other than the above conditions.

<Coating Step>

In the coating step, an Al-based coating is applied to form an Al-based coating on the surface of the steel sheet to obtain a coated steel sheet. A method for forming the Al-based coating is not particularly limited, and a hot-dip plating method, an electro plating method, a vacuum vapor deposition method, a cladding method, a thermal spraying method, and the like can be used. The hot-dip plating method is the most popular in the industry.

In a case where hot-dip plating is performed, Fe is mixed in the plating bath as an impurity in addition to Al in many cases. Furthermore, in addition to the above-mentioned elements, Si, Ni, Mg, Ti, Zn, Sb, Sn, Cu, Co, In, Bi, Ca, mischmetal, and the like may be contained in the plating bath as long as 70% or more of Al is contained.

In a case of performing plating, plating may be performed after cooling the annealed steel sheet after the annealing step to room temperature, or dip plating may be performed by cooling to 650° C. to 750° C. after the annealing without temporarily cooling to room temperature.

In the method for producing a coated steel sheet according to the present embodiment, in a case where the total content of Si and Ni contained in the region (upper layer) containing 70 mass % or more of Al is set to 5.0 to 30.0 mass %, in the case of hot-dip plating, the Al-based coating is applied using the plating bath containing Si and Ni in a total amount of 7.0 to 30.0 mass %. For example, the Al-based coating is applied by immersing the annealed steel sheet in a plating bath containing Si and Ni in a total amount of 7.0 to 30.0 mass % or more and the remainder of Al and impurities. Even in a case where Si or Ni is contained in a total amount of 7.0% or more, Mg, Ti, Zn, Sb, Sn, Cu, Co, In, Bi, Ca, mischmetal, and the like may be contained as described above.

However, in a case where the above-mentioned hot-rolled sheet annealing is performed, Cr is concentrated in the lower layer of the coating and the diffusion of C can be suppressed. Therefore, the amount of Si and Ni of the upper layer of the coating does not have to be set to 5.0 mass % or more. Therefore, in a case where the hot-rolled sheet annealing is performed, in this coating step, the plating bath may not contain Si and Ni in a total amount of 7.0 to 30.0 mass %.

Pretreatments and post-treatments of the Al-based coating are not particularly limited, and precoating, solvent coating, an alloying treatment, and the like are possible.

(D) Method for Producing Coated Steel Member

Next, a method for producing the coated steel member according to the present embodiment will be described.

By subjecting the coated steel sheet produced as described above to a heat treatment described later, it is possible to obtain the coated steel member according to the present embodiment having the high Al content region and the low Al content region, in which the maximum C content of the high Al content region is 25% or less of the C content of the steel sheet substrate, the maximum C content of the low Al content region is 40% or less of the C content of the steel sheet substrate, and the maximum C content in the range from the interface between the steel sheet substrate and the coating to the depth of 10 µm in the steel sheet substrate is 80% or less of the C content of the steel sheet substrate.

That is, by performing the heat treatment on the coated steel sheet to the present embodiment, it is possible to obtain the coated steel member according to the present embodiment. In a case where the heat treatment is performed using the coated steel sheet produced by performing the hot-rolled sheet annealing, it is possible to obtain a coated steel member in which the maximum Cr content in the high Al content region is 80% or more of the Cr content of the steel sheet substrate.

For example, the heat treatment conditions are conditions under which the coated steel sheet obtained by the above method is heated to an $Ac_3$ point to ($Ac_3$ point+300°) C at a temperature rising rate of 1.0 to 1000° C./s and is cooled to an Ms point or lower at an upper critical cooling rate or more.

When the temperature rising rate is less than 1.0° C./s, the productivity of the heat treatment decreases, which is not preferable. On the other hand, when the temperature rising rate exceeds 1000° C./s, a duplex grain structure is formed and the toughness decreases, which is not preferable.

When the heat treatment temperature is lower than the $Ac_3$ point, ferrite remains after cooling and the strength and toughness are insufficient, which is not preferable. On the other hand, it is preferable that when the heat treatment temperature exceeds the $Ac_3$ point+300° C., the maximum C content of the high Al content region becomes more than 25% of the C content of the steel sheet substrate, the maximum C content of the low Al content region becomes more than 40% of the C content of the steel sheet substrate, and the maximum C content in the range from the interface between the steel sheet substrate and the coating to the depth of 10 µm in the steel sheet substrate becomes more than 80% of the C content of the steel sheet substrate. In addition, the structure becomes coarse and the toughness decreases, which is not preferable.

The upper critical cooling rate is the minimum cooling rate at which austenite is supercooled to generate martensite without causing precipitation of ferrite and pearlite in the structure. When cooling is performed at lower than the upper critical cooling rate, ferrite and pearlite are generated, resulting in insufficient strength.

At the time of heating, holding for 1 to 300 seconds may be performed. In addition, after cooling, a tempering treatment at about 100° C. to 600° C. may be performed in order to adjust the strength of the steel member.

The $Ac_3$ point, the Ms point, and the upper critical cooling rate are measured by the following method.

A strip-shaped test piece having a width of 30 mm and a length of 200 mm is cut out from a steel sheet having the same chemical composition as the coated steel member according to the present embodiment, and the test piece is heated to 1000° C. at a temperature rising rate of 10° C./s in a nitrogen atmosphere, held at the temperature for 5 minutes, and then cooled to room temperature at various cooling rates. The cooling rate is set at intervals of 10° C./s from 1° C./s to 100° C./s. By measuring the change in thermal expansion of the test piece during heating and cooling at that time, the $Ac_3$ point and the Ms point are measured.

Among the test pieces cooled at the above cooling rates, the minimum cooling rate at which ferrite is not precipitated is defined as the upper critical cooling rate.

Here, in the above series of heat treatments, simultaneously with a step of heating to a temperature range of the $Ac_3$ point to ($Ac_3$ point+300°) C and then cooling to the Ms point, that is, cooling at the upper critical cooling rate or more, hot forming such as hot stamping may be performed. As the hot forming, there are bending, drawing, stretching, hole widening, flange forming, and the like. Furthermore, the present invention may be applied to a forming method other than press forming, for example, roll forming, as long as a method for cooling the steel sheet is provided simultaneously with or immediately after forming. In a case where the thermal history described above is followed, hot forming may be repeatedly performed.

As described above, in the present embodiment, both a formed body obtained by hot forming and a flat sheet obtained by only a heat treatment are collectively referred to as a "coated steel member".

Moreover, hot forming or a heat treatment performed on a portion of the steel to obtain a coated steel member having regions with different strengths.

The above series of heat treatments can be performed by any method, and may be performed by, for example, induction heating hardening, energization heating, infrared heating, or furnace heating.

EXAMPLES

Hereinafter, the present invention will be described more specifically with reference to examples, but the present invention is not limited thereto.

First, in producing a coated steel member and a coated steel sheet, steels having the chemical compositions shown in Tables 1 to 4 were melted to obtain slabs for hot rolling.

Example 1

The obtained slab was hot-rolled and coiled at a temperature of 800° C. or lower to obtain a hot-rolled steel sheet having a thickness of 2.7 mm.

Among the kinds of steel shown in Tables 1 to 4, hot-rolled steel sheets Nos. B32 to B46 and b35 to b37 having the steel compositions of Steel Nos. A1, A5, A10, A16, A21, and A27 to A31 were subjected to annealing (hot-rolled sheet annealing) in an atmosphere containing 98% of nitrogen at 650° C. for 12 hours.

The hot-rolled steel sheet after the hot rolling or after the hot-rolled sheet annealing was cold-rolled to obtain a cold-rolled steel sheet having a thickness of 1.6 mm. The cold-rolled steel sheet was subjected to annealing under the conditions (dew point, temperature, time) shown in Tables 5, 7, and 9. The cold-rolled steel sheet after the annealing was subjected to Al plating to obtain a coated steel sheet having an Al-based coating. In the plating step, hot-dip Al plating was performed using a plating bath containing Si and Ni in a total amount of 3.0 to 10.0 mass %.

The chemical composition of the coated steel sheet thickness at a thickness ¼ position from the surface in the sheet thickness direction of the steel sheet was similar to the chemical composition of the slab.

TABLE 1

| | Steel No. | Chemical composition (mass %) remainder being Fe and impurities | | | | | | | | | | |
|---|---|---|---|---|---|---|---|---|---|---|---|---|
| | | C | Si | Mn | P | S | N | Ti | B | Nb | Cr | Ni | Cu |
| Invention Example | A1 | 0.28 | 0.20 | 1.25 | 0.010 | 0.0006 | 0.004 | 0.030 | 0.0020 | 0.06 | 0.20 | | 0.01 |
| | A2 | 0.55 | 0.15 | 0.40 | 0.007 | 0.0005 | 0.003 | 0.032 | 0.0026 | 0.04 | | 0.10 | |
| | A3 | 0.36 | 0.30 | 1.20 | 0.008 | 0.0005 | 0.004 | 0.040 | 0.0025 | 0.05 | | | 0.20 |
| | A4 | 0.32 | 1.60 | 0.90 | 0.009 | 0.0006 | 0.003 | 0.032 | 0.0026 | 0.05 | | | |
| | A5 | 0.42 | 0.60 | 0.40 | 0.008 | 0.0010 | 0.002 | 0.035 | 0.0021 | 0.07 | 0.15 | | 0.10 |
| | A6 | 0.30 | 0.40 | 2.40 | 0.007 | 0.0008 | 0.002 | 0.026 | 0.0024 | 0.06 | | | |
| | A7 | 0.29 | 0.25 | 0.75 | 0.030 | 0.0005 | 0.003 | 0.038 | 0.0020 | 0.04 | | | |
| | A8 | 0.31 | 0.50 | 0.60 | 0.005 | 0.0080 | 0.002 | 0.040 | 0.0025 | 0.04 | | | 0.15 |
| | A9 | 0.33 | 0.70 | 0.75 | 0.009 | 0.0012 | 0.008 | 0.032 | 0.0026 | 0.05 | | | |
| | A10 | 0.30 | 0.55 | 0.70 | 0.008 | 0.0010 | 0.003 | 0.020 | 0.0025 | 0.04 | 0.18 | | |
| | A11 | 0.45 | 0.63 | 0.65 | 0.012 | 0.0009 | 0.002 | 0.080 | 0.0026 | 0.05 | | | 0.30 |
| | A12 | 0.34 | 0.38 | 0.85 | 0.014 | 0.0011 | 0.004 | 0.034 | 0.0010 | 0.06 | | 0.18 | |
| | A13 | 0.34 | 0.41 | 0.75 | 0.016 | 0.0008 | 0.003 | 0.022 | 0.0060 | 0.04 | | | |
| | A14 | 0.36 | 0.40 | 0.97 | 0.010 | 0.0010 | 0.004 | 0.040 | 0.0025 | 0.03 | | | 0.30 |
| | A15 | 0.37 | 0.45 | 0.80 | 0.008 | 0.0009 | 0.003 | 0.032 | 0.0017 | 0.08 | | 0.23 | |
| | A16 | 0.32 | 0.52 | 0.78 | 0.010 | 0.0009 | 0.004 | 0.040 | 0.0025 | 0.04 | 0.60 | 0.10 | 0.20 |
| | A17 | 0.48 | 0.20 | 0.79 | 0.009 | 0.0006 | 0.005 | 0.032 | 0.0022 | 0.04 | | 0.60 | |
| | A18 | 0.50 | 0.39 | 0.65 | 0.011 | 0.0008 | 0.004 | 0.040 | 0.0025 | 0.06 | | | 0.60 |
| | A19 | 0.31 | 0.40 | 0.55 | 0.010 | 0.0005 | 0.003 | 0.032 | 0.0026 | 0.07 | | 0.05 | |
| | A20 | 0.45 | 0.22 | 0.67 | 0.007 | 0.0007 | 0.006 | 0.040 | 0.0028 | 0.05 | | | |
| | A21 | 0.40 | 0.51 | 0.78 | 0.008 | 0.0006 | 0.003 | 0.032 | 0.0026 | 0.05 | 0.25 | 0.23 | 0.20 |
| | A22 | 0.42 | 0.35 | 1.10 | 0.005 | 0.0008 | 0.004 | 0.040 | 0.0022 | 0.06 | | | |
| | A23 | 0.31 | 0.63 | 0.75 | 0.010 | 0.0008 | 0.004 | 0.040 | 0.0020 | 0.07 | | | |
| | A24 | 0.45 | 0.43 | 0.65 | 0.008 | 0.0005 | 0.003 | 0.032 | 0.0018 | 0.05 | | 0.20 | 0.20 |
| | A25 | 0.31 | 0.47 | 0.60 | 0.010 | 0.0004 | 0.005 | 0.040 | 0.0025 | 0.04 | | | |
| | A26 | 0.35 | 0.26 | 1.05 | 0.014 | 0.0005 | 0.003 | 0.032 | 0.0026 | 0.04 | | | |
| | A27 | 0.28 | 0.15 | 1.20 | 0.010 | 0.0010 | 0.003 | 0.030 | 0.0020 | 0.05 | 0.38 | | 0.01 |
| | A28 | 0.30 | 0.40 | 0.80 | 0.010 | 0.0008 | 0.004 | 0.035 | 0.0025 | 0.05 | 0.14 | 0.10 | 0.25 |
| | A29 | 0.35 | 0.42 | 0.60 | 0.010 | 0.0009 | 0.003 | 0.026 | 0.0026 | 0.04 | 0.12 | 0.15 | 0.20 |
| | A30 | 0.50 | 0.42 | 0.40 | 0.008 | 0.0005 | 0.003 | 0.022 | 0.0025 | 0.04 | 0.12 | 0.15 | 0.20 |
| | A31 | 0.34 | 0.60 | 0.60 | 0.015 | 0.0020 | 0.004 | 0.030 | 0.0025 | 0.04 | 0.40 | 0.40 | 0.01 |

TABLE 2

| | Steel No. | Chemical composition (mass %) remainder being Fe and impurities | | | | | | | | Transformation point (° C.) | | Upper critical cooling rate (° C./s) |
|---|---|---|---|---|---|---|---|---|---|---|---|---|
| | | Mo | V | Ca | Al | Sn | W | Sb | REM | Ac3 | Ms | |
| Invention Example | A1 | | 0.01 | 0.001 | 0.04 | | | | | 806 | 391 | 20 |
| | A2 | 0.20 | | | 0.04 | | 0.01 | | 0.02 | 771 | 316 | 10 |
| | A3 | 0.10 | 0.01 | | | | | 0.01 | | 791 | 361 | 20 |
| | A4 | | | | | | | | | 894 | 381 | 20 |
| | A5 | 0.20 | | | 0.02 | | | | 0.01 | 825 | 362 | 20 |
| | A6 | 0.05 | 0.10 | 0.003 | 0.03 | | | 0.05 | | 775 | 340 | 10 |
| | A7 | 0.15 | 0.05 | | | | 0.18 | | | 828 | 406 | 30 |
| | A8 | | 0.10 | | | 0.12 | | | | 828 | 404 | 30 |
| | A9 | | 0.30 | | 0.05 | | | 0.15 | | 835 | 389 | 30 |
| | A10 | | | 0.002 | | | 0.15 | | 0.15 | 834 | 399 | 30 |
| | A11 | | | | 0.02 | | 0.01 | | | 829 | 341 | 30 |
| | A12 | 0.20 | | | | | | | | 810 | 380 | 30 |
| | A13 | | | | 0.02 | 0.24 | | | | 816 | 387 | 10 |
| | A14 | | 0.25 | | | | 0.30 | | 0.12 | 804 | 368 | 20 |
| | A15 | 0.15 | | | | | | 0.18 | | 804 | 369 | 20 |
| | A16 | | | 0.003 | | 0.16 | | | | 841 | 379 | 20 |
| | A17 | | | | 0.04 | | | | 0.18 | 772 | 318 | 20 |
| | A18 | | | | | | 0.25 | | | 787 | 321 | 20 |
| | A19 | 0.50 | | 0.002 | | | | 0.15 | | 827 | 404 | 10 |
| | A20 | 0.10 | 0.60 | | | | 0.20 | | | 788 | 347 | 30 |
| | A21 | | | 0.008 | | 0.15 | | 0.25 | | 812 | 352 | 30 |
| | A22 | | 0.10 | | 0.60 | | | | | 787 | 342 | 20 |
| | A23 | 0.25 | | | | 0.50 | | | 0.14 | 839 | 396 | 30 |
| | A24 | | | 0.002 | | | 0.60 | | | 797 | 339 | 30 |
| | A25 | | | | | 0.12 | 0.20 | 0.50 | | 831 | 404 | 40 |
| | A26 | | | | | | | | 0.20 | 797 | 374 | 30 |
| | A27 | | 0.01 | 0.001 | 0.03 | | | 0.01 | 0.01 | 808 | 388 | 20 |
| | A28 | 0.20 | | | 0.04 | | | 0.01 | | 823 | 394 | 20 |
| | A29 | 0.20 | | 0.001 | 0.03 | 0.10 | 0.01 | | 0.01 | 812 | 380 | 20 |
| | A30 | 0.20 | 0.10 | | 0.04 | 0.10 | 0.10 | | 0.01 | 793 | 330 | 20 |
| | A31 | 0.20 | | 0.005 | 0.04 | | | | | 835 | 373 | 20 |

TABLE 3

| | Steel No. | Chemical composition (mass %) remainder being Fe and impurities | | | | | | | | | | |
|---|---|---|---|---|---|---|---|---|---|---|---|---|
| | | C | Si | Mn | P | S | N | Ti | B | Nb | Cr | Ni | Cu |
| Comparative Example | a1 | 0.13 | 0.40 | 0.85 | 0.010 | 0.0008 | 0.004 | 0.040 | 0.0025 | 0.04 | 0.26 | 0.10 | |
| | a2 | 0.90 | 0.20 | 0.40 | 0.005 | 0.0004 | 0.002 | 0.020 | 0.0020 | 0.04 | 0.10 | | 0.05 |
| | a3 | 0.30 | 0.02 | 0.35 | 0.011 | 0.0007 | 0.004 | 0.060 | 0.0015 | 0.04 | 0.20 | | 0.10 |
| | a4 | 0.45 | 3.00 | 1.50 | 0.007 | 0.0008 | 0.005 | 0.032 | 0.0018 | 0.06 | 0.40 | 0.25 | |
| | a5 | 0.36 | 0.40 | 0.04 | 0.009 | 0.0009 | 0.004 | 0.040 | 0.0025 | 0.07 | | | |
| | a6 | 0.38 | 0.45 | 5.00 | 0.008 | 0.0010 | 0.003 | 0.032 | 0.0026 | 0.06 | | | 0.10 |
| | a7 | 0.38 | 0.52 | 0.90 | 0.100 | 0.0009 | 0.007 | 0.040 | 0.0017 | 0.04 | | 0.20 | |
| | a8 | 0.43 | 0.47 | 0.80 | 0.010 | 0.1000 | 0.002 | 0.040 | 0.0025 | 0.05 | 0.43 | | |
| | a9 | 0.39 | 0.29 | 0.85 | 0.010 | 0.0010 | 0.100 | 0.032 | 0.0030 | 0.05 | | | |
| | a10 | 0.45 | 0.40 | 0.79 | 0.009 | 0.0010 | 0.002 | 0.001 | 0.0029 | 0.05 | | | |
| | a11 | 0.34 | 0.56 | 1.00 | 0.009 | 0.0008 | 0.006 | 0.300 | 0.0026 | 0.04 | | 0.20 | |
| | a12 | 0.34 | 0.45 | 0.69 | 0.008 | 0.0012 | 0.004 | 0.021 | 0.0002 | 0.04 | 0.30 | | 0.10 |
| | a13 | 0.40 | 0.52 | 0.74 | 0.010 | 0.0009 | 0.002 | 0.022 | 0.0300 | 0.05 | | | |
| | a14 | 0.36 | 0.50 | 1.00 | 0.009 | 0.0008 | 0.004 | 0.021 | 0.0025 | 0.01 | | 0.20 | |
| | a15 | 0.37 | 0.25 | 0.45 | 0.010 | 0.0009 | 0.006 | 0.035 | 0.0020 | 0.25 | | | |
| | a16 | 0.41 | 0.39 | 1.10 | 0.011 | 0.0006 | 0.003 | 0.022 | 0.0015 | 0.05 | 2.00 | | 0.30 |
| | a17 | 0.42 | 0.40 | 0.81 | 0.008 | 0.0009 | 0.005 | 0.021 | 0.0025 | 0.06 | | | |
| | a18 | 0.39 | 0.66 | 1.00 | 0.015 | 0.0005 | 0.007 | 0.040 | 0.0018 | 0.04 | | 0.25 | |
| | a19 | 0.42 | 0.51 | 0.76 | 0.008 | 0.0008 | 0.005 | 0.026 | 0.0026 | 0.07 | 0.22 | | |

TABLE 4

| | Steel No. | Chemical composition (mass %) remainder being Fe and impurities | | | | | | | | Transformation point (° C.) | | Upper critical cooling rate (° C./s) |
|---|---|---|---|---|---|---|---|---|---|---|---|---|
| | | Mo | V | Ca | Al | Sn | W | Sb | REM | Ac3 | Ms | |
| Comparative Example | a1 | | | | 0.03 | | | | 0.03 | 867 | 461 | 40 |
| | a2 | 0.10 | | 0.002 | | | 0.10 | | 0.03 | 770 | 172 | 10 |
| | a3 | | 0.10 | | 0.10 | 0.30 | | 0.35 | | 824 | 415 | 70 |
| | a4 | | | | | | | | | 915 | 278 | 20 |
| | a5 | | 0.25 | 0.005 | | | | | 0.25 | 831 | 403 | 100 |
| | a6 | | | | 0.05 | | 0.18 | | | 765 | 209 | 10 |
| | a7 | 0.01 | | | | | | 0.15 | | 878 | 359 | 30 |
| | a8 | | 0.30 | | | 0.25 | | | | 819 | 336 | 30 |
| | a9 | 0.20 | | 0.003 | | | 0.20 | | | 794 | 364 | 20 |
| | a10 | | | | | | | | 0.10 | 783 | 338 | 50 |
| | a11 | | 0.01 | | 0.04 | 0.22 | | 0.01 | | 910 | 372 | 30 |
| | a12 | | | | | | | | | 821 | 383 | 50 |
| | a13 | | 0.25 | | | | 0.30 | | 0.04 | 806 | 362 | 20 |
| | a14 | 0.30 | | | 0.03 | | | | | 803 | 365 | 20 |
| | a15 | | | | 0.04 | 0.10 | | 0.32 | | 807 | 382 | 50 |
| | a16 | | | 0.003 | | 0.25 | | | 0.24 | 851 | 301 | 20 |
| | a17 | 1.50 | 0.45 | | | | 0.35 | | | 793 | 349 | 10 |
| | a18 | | | | 0.06 | 2.00 | | 0.35 | | 824 | 346 | 30 |
| | a19 | | 0.30 | | | 0.35 | 0.20 | 1.50 | | 812 | 348 | 20 |

Regarding the obtained coated steel sheet, a lower layer containing 3 mass % or more and less than 70 mass % of Al and an upper layer containing 70 mass % or more and 95 mass % or less of Al were determined, and the total amount of Si and Ni in the upper layer, the maximum C content from the interface between the steel sheet and the coating to a depth of 20 μm on the steel sheet side, and the Cr content in the lower layer were evaluated.

Specifically, the maximum values of the total amount of Si and Ni in the upper layer and the Cr content in the lower layer in the Al-based coating were obtained by performing glow discharge emission analysis (GDS) in the sheet thickness direction from the surface of the coated steel sheet as follows. When obtaining the maximum values of the amount of Si and Ni of the upper layer and the Cr content of the lower layer, a region where the Al content was 3 mass % or more and the Fe content was less than 95 mass % was determined to be the Al-based coating, and a region where the Fe content was 95 mass % or more was determined to be the steel sheet. In addition, in the Al-based coating, a region where the Al content was 70 mass % or more was determined to be the upper layer, and a region where the Al content was less than 70% was determined to be the lower layer. Glow discharge emission analysis (GDS) was performed at an approximately ¼ position of width (short direction) from an width direction end portion of the coated steel member in the sheet thickness direction from the surface of the coated steel sheet to obtain the Si content and the Ni content in the upper layer, and the sum of the Si content and the Ni content at a position where the total content was the largest was used as the total amount of Si and Ni of the upper layer in the upper layer. Furthermore, glow discharge emission analysis (GDS) was performed at an approximately ¼ position of width (short direction) from the width direction end portion of the coated steel sheet in the sheet thickness direction from the surface of the coated steel sheet to measure the maximum value of the Cr content in the lower layer. This measurement was performed a total of five times, and the values obtained in each measurement were averaged to obtain the maximum values of the total amount of Si and Ni of the upper layer in the upper layer and the Cr content of the lower layer.

The evaluation results are shown in Tables 5 to 10.

In addition, a heat treatment of heating the coated steel sheet to 920° C. at a temperature rising rate of 5.0° C./s and cooling the coated steel sheet to an Ms point or lower at 50° C./s was performed to obtain a coated steel member.

The obtained coated steel member was cut out and subjected to glow discharge emission analysis (GDS), a tensile test, a bending test, and a Charpy impact test by the following methods, and the maximum C content in the coating region containing 30 mass % or more of Al, the maximum C content in the region containing 3 mass % or more and less than 30 mass % of Al, the maximum C content in the range from the interface between the steel sheet substrate and the coating to the depth of 10 μm on the steel sheet substrate side, the maximum Cr content in the high Al content region, tensile strength, bending angle, and impact value were evaluated. The evaluation results are shown in Tables 5 to 10.

<Maximum C contents in High Al Content Region and Low Al Content Region>

GDS was performed in the sheet thickness direction from the surface of the coated steel member to examine the Al content and the C content. The GDS measurement was performed at five points at random at a ¼ position of width (short direction) from the width direction end portion of the coated steel member. As a result of the measurement, a region where the Al content was 30 mass % or more was determined to be the high Al content region, a region where the Al content was 3 mass % or more and less than 30 mass % was determined to be the low Al content region, the maximum C content in the high Al content region and the maximum C content in the low Al content region were obtained, the measurement was performed five times, and the average values thereof were used to obtain the maximum C content in the high Al content region and the maximum C content in the low Al content region.

<Maximum C Content in Range from Surface of Steel Sheet Substrate to Depth of 10 μm>

GDS was performed in the sheet thickness direction from the surface of the coated steel member to examine the Fe content and the C content. In the GDS measurement, at the ¼ position of width (short direction) from the width direction end portion of the coated steel member, the maximum C concentration in the range from the surface of the steel sheet substrate to a depth of 10 μm was obtained. The measurement was performed five times, and the average values thereof were used to obtain the maximum C content in the range from the surface of the steel sheet substrate to the depth of 10 μm. Here, the surface of the steel sheet substrate is set to a depth position at which the Fe content was 95% or more.

<Maximum Cr Content in High Al Content Region>

GDS was performed in the sheet thickness direction from the surface of the coated steel member to examine the Al content and the Cr content. The GDS measurement was performed at five points at random at a ¼ position of width (short direction) from the width direction end portion of the coated steel member. As a result of the measurement, a region where the Al content was 30 mass % or more was determined to be the high Al content region, a region where the Al content was 3 mass % or more and less than 30 mass % was determined to be the low Al content region, and the maximum Cr content in the high Al content region was obtained. The measurement was performed five times, and the average value thereof was used to obtain the maximum Cr content in the high Al content region.

<Tensile Strength>

A tensile test was performed in accordance with ASTM Standard E8. After grinding a soaked portion of the coated steel member to a thickness of 1.2 mm, a half-sized sheet-shaped test piece of ASTM standard E8 (parallel portion length: 32 mm, parallel portion sheet width: 6.25 mm) was collected so that the test direction was parallel to the rolling direction. Then, a room temperature tensile test was performed at a strain rate of 3 mm/min to measure the tensile strength (maximum strength). In this example, a case where the tensile strength exceeded 1500 MPa was evaluated as having excellent strength.

<Bending Angle>

A bending test was performed in accordance with the regulations of VDA238-100. A bending test piece of 60 mm parallel and 30 mm perpendicular to the rolling direction was collected from the soaked portion of the coated steel member. A bending punch was aligned so as to be perpendicular to the rolling direction, and a bending angle at the maximum load was measured. Since the bending angle correlates with the strength, in this example, a case of having a bending angle of 60 degrees when the tensile strength was less than 2100 MPa and a bending angle of more than 50 degrees when the tensile strength was 2100 MPa or more was evaluated as having better bendability than in the related art.

<Impact Value>

A Charpy impact test was performed in accordance with JIS Z 2242: 2018. A 2 mm V-notch test piece was prepared by cutting out 55 mm in the rolling direction and 10 mm in the direction perpendicular thereto from the soaked portion of the coated steel member and laminating three cut-out portions, a Charpy impact test was performed thereon at a test temperature of −40° C., and an impact value (J/cm$^2$) was obtained by dividing the absorbed energy vE by the cross-sectional area of the test piece at the bottom of the notch. Since the impact value correlates with the strength, in this example, a case of having an impact value of 35 J/cm$^2$ or more when the tensile strength was less than 2100 MPa and an impact value of 20 J/cm$^2$ or more when the tensile strength was 2100 MPa or more was evaluated as having excellent toughness.

TABLE 5

| | | Production conditions | | | | | | | |
|---|---|---|---|---|---|---|---|---|---|
| | | Hot-rolled sheet annealing | | | Annealing | | | | |
| | | N₂ | | | Dew | | | | |
| | | | | | point | | | Coating | |
| | Steel | concentration | Temperature | Time | point | Temperature | Time | Kind | Si + Ni |
| Symbol | No. | % | °C. | hr | °C. | °C. | sec | — | (mass %) |
| Invention Example B1 | A1 | — | — | — | 5 | 760 | 60 | Hot-dip plating | 10.0 |
| B2 | A2 | — | — | — | 5 | 760 | 60 | Hot-dip plating | 10.0 |
| B3 | A3 | — | — | — | 5 | 760 | 60 | Hot-dip plating | 10.0 |
| B4 | A4 | — | — | — | 5 | 760 | 60 | Hot-dip plating | 10.0 |
| B5 | A5 | — | — | — | 5 | 760 | 60 | Hot-dip plating | 10.0 |
| B6 | A6 | — | — | — | 5 | 760 | 60 | Hot-dip plating | 10.0 |
| B7 | A7 | — | — | — | 5 | 760 | 60 | Hot-dip plating | 10.0 |
| B8 | A8 | — | — | — | 5 | 760 | 60 | Hot-dip plating | 10.0 |
| B9 | A9 | — | — | — | 5 | 760 | 60 | Hot-dip plating | 10.0 |
| B10 | A10 | — | — | — | 5 | 760 | 60 | Hot-dip plating | 10.0 |
| B11 | A11 | — | — | — | 5 | 760 | 60 | Hot-dip plating | 10.0 |
| B12 | A12 | — | — | — | 5 | 760 | 60 | Hot-dip plating | 10.0 |
| B13 | A13 | — | — | — | 5 | 760 | 60 | Hot-dip plating | 10.0 |
| B14 | A14 | — | — | — | 5 | 760 | 60 | Hot-dip plating | 10.0 |
| B15 | A15 | — | — | — | 5 | 760 | 60 | Hot-dip plating | 10.0 |
| B16 | A16 | — | — | — | 5 | 760 | 60 | Hot-dip plating | 10.0 |
| B17 | A17 | — | — | — | 5 | 760 | 60 | Hot-dip plating | 10.0 |
| B18 | A18 | — | — | — | 5 | 760 | 60 | Hot-dip plating | 10.0 |
| B19 | A19 | — | — | — | 5 | 760 | 60 | Hot-dip plating | 10.0 |
| B20 | A20 | — | — | — | 5 | 760 | 60 | Hot-dip plating | 10.0 |
| B21 | A21 | — | — | — | 5 | 760 | 60 | Hot-dip plating | 10.0 |
| B22 | A22 | — | — | — | 5 | 760 | 60 | Hot-dip plating | 10.0 |
| B23 | A23 | — | — | — | 5 | 760 | 60 | Hot-dip plating | 10.0 |

| | | Coated steel sheet | | | Production conditions | |
|---|---|---|---|---|---|---|
| | | | | | Heat treatment | |
| | | Amount of Si + Ni in upper layer | C content in surface layer of steel sheet | Maximum Cr content in lower layer | Temperature rising rate | Heating temperature |
| | Symbol | (mass %) | (mass %) | (mass %) | (°C./s) | (°C.) |
| Invention Example | B1 | 8.8 | 0.17 | 0.22 | 5 | 920 |
| | B2 | 8.8 | 0.39 | 0.00 | 5 | 920 |
| | B3 | 8.9 | 0.24 | 0.00 | 5 | 920 |
| | B4 | 8.5 | 0.20 | 0.00 | 5 | 920 |
| | B5 | 8.9 | 0.30 | 0.15 | 5 | 920 |
| | B6 | 8.7 | 0.19 | 0.00 | 5 | 920 |
| | B7 | 8.7 | 0.17 | 0.00 | 5 | 920 |
| | B8 | 9.0 | 0.20 | 0.00 | 5 | 920 |
| | B9 | 9.0 | 0.21 | 0.00 | 5 | 920 |
| | B10 | 8.8 | 0.18 | 0.20 | 5 | 920 |
| | B11 | 8.7 | 0.31 | 0.00 | 5 | 920 |
| | B12 | 8.7 | 0.22 | 0.00 | 5 | 920 |
| | B13 | 8.6 | 0.22 | 0.00 | 5 | 920 |
| | B14 | 8.8 | 0.23 | 0.00 | 5 | 920 |
| | B15 | 8.9 | 0.25 | 0.00 | 5 | 920 |
| | B16 | 8.8 | 0.20 | 0.70 | 5 | 920 |
| | B17 | 8.7 | 0.34 | 0.00 | 5 | 920 |
| | B18 | 8.9 | 0.36 | 0.00 | 5 | 920 |
| | B19 | 9.0 | 0.20 | 0.00 | 5 | 920 |
| | B20 | 8.7 | 0.32 | 0.00 | 5 | 920 |
| | B21 | 8.7 | 0.26 | 0.27 | 5 | 920 |
| | B22 | 8.8 | 0.30 | 0.00 | 5 | 920 |
| | B23 | 8.9 | 0.20 | 0.00 | 5 | 920 |

TABLE 6

| | | | Coated steel member | | | | | | | |
|---|---|---|---|---|---|---|---|---|---|---|
| | | | Production conditions Heat treatment | | Maximum C content in | Maximum C content in | Maximum C concentration in surface | Maximum Cr content in | | | |
| | | | Cooling rate to Ms or lower (° C./s) | Upper critical cooling rate (° C./s) | high Al content region (mass %) | low Al content region (mass %) | layer of steel sheet substrate (mass %) | high Al content region (mass %) | Tensile strength (MPa) | Bending angle (°) | Impact value (J/cm$^2$) |
| | Symbol | Steel No. | | | | | | | | | |
| Invention Example | B1 | A1 | 50 | 20 | 0.05 | 0.08 | 0.18 | 0.12 | 1705 | 71 | 53 |
| | B2 | A2 | 50 | 10 | 0.12 | 0.19 | 0.40 | 0.00 | 2873 | 52 | 22 |
| | B3 | A3 | 50 | 20 | 0.06 | 0.12 | 0.24 | 0.00 | 2070 | 61 | 38 |
| | B4 | A4 | 50 | 20 | 0.06 | 0.10 | 0.20 | 0.00 | 1855 | 65 | 42 |
| | B5 | A5 | 50 | 20 | 0.08 | 0.13 | 0.29 | 0.09 | 2269 | 57 | 28 |
| | B6 | A6 | 50 | 10 | 0.05 | 0.08 | 0.19 | 0.00 | 1908 | 63 | 38 |
| | B7 | A7 | 50 | 30 | 0.05 | 0.09 | 0.17 | 0.00 | 1699 | 70 | 50 |
| | B8 | A8 | 50 | 30 | 0.05 | 0.08 | 0.20 | 0.00 | 1777 | 66 | 45 |
| | B9 | A9 | 50 | 30 | 0.05 | 0.10 | 0.22 | 0.00 | 1881 | 63 | 39 |
| | B10 | A10 | 50 | 30 | 0.05 | 0.08 | 0.20 | 0.08 | 1736 | 68 | 46 |
| | B11 | A11 | 50 | 30 | 0.07 | 0.15 | 0.32 | 0.00 | 2433 | 55 | 25 |
| | B12 | A12 | 50 | 30 | 0.07 | 0.09 | 0.22 | 0.00 | 1941 | 62 | 38 |
| | B13 | A13 | 50 | 10 | 0.07 | 0.10 | 0.23 | 0.00 | 1928 | 62 | 39 |
| | B14 | A14 | 50 | 20 | 0.06 | 0.10 | 0.24 | 0.00 | 2046 | 62 | 37 |
| | B15 | A15 | 50 | 20 | 0.07 | 0.10 | 0.26 | 0.00 | 2072 | 61 | 37 |
| | B16 | A16 | 50 | 20 | 0.06 | 0.09 | 0.22 | 0.40 | 1842 | 64 | 45 |
| | B17 | A17 | 50 | 20 | 0.09 | 0.15 | 0.34 | 0.00 | 2584 | 54 | 24 |
| | B18 | A18 | 50 | 20 | 0.09 | 0.17 | 0.35 | 0.00 | 2659 | 53 | 23 |
| | B19 | A19 | 50 | 10 | 0.06 | 0.08 | 0.21 | 0.00 | 1769 | 72 | 46 |
| | B20 | A20 | 50 | 30 | 0.09 | 0.15 | 0.32 | 0.00 | 2431 | 56 | 25 |
| | B21 | A21 | 50 | 30 | 0.08 | 0.13 | 0.26 | 0.16 | 2208 | 58 | 28 |
| | B22 | A22 | 50 | 20 | 0.08 | 0.14 | 0.29 | 0.00 | 2334 | 57 | 27 |
| | B23 | A23 | 50 | 30 | 0.06 | 0.08 | 0.20 | 0.00 | 1790 | 65 | 44 |

TABLE 7

| | | | Production conditions | | | | | | | |
|---|---|---|---|---|---|---|---|---|---|---|
| | | | Hot-rolled sheet annealing | | | Annealing | | | | |
| | | | N$_2$ | | | Dew | | | Coating | |
| | Symbol | Steel No. | concentration % | Temperature ° C. | Time hr | point ° C. | Temperature ° C. | Time sec | Kind — | Si + Ni (mass %) |
| Invention Example | B24 | A24 | — | — | — | 5 | 760 | 60 | Hot-dip plating | 10.0 |
| | B25 | A25 | — | — | — | 5 | 760 | 60 | Hot-dip plating | 10.0 |
| | B26 | A26 | — | — | — | 5 | 760 | 60 | Hot-dip plating | 10.0 |
| | B27 | A27 | — | — | — | 5 | 760 | 60 | Hot-dip plating | 10.0 |
| | B28 | A28 | — | — | — | 5 | 760 | 60 | Hot-dip plating | 10.0 |
| | B29 | A29 | — | — | — | 5 | 760 | 60 | Hot-dip plating | 10.0 |
| | B30 | A30 | — | — | — | 5 | 760 | 60 | Hot-dip plating | 10.0 |
| | B31 | A31 | — | — | — | 5 | 760 | 60 | Hot-dip plating | 10.0 |
| | B32 | A1 | 98 | 650 | 12 | −30 | 740 | 15 | Hot-dip plating | 3.0 |
| | B33 | A5 | 98 | 650 | 12 | −30 | 740 | 15 | Hot-dip plating | 3.0 |
| | B34 | A10 | 98 | 650 | 12 | −30 | 740 | 15 | Hot-dip plating | 3.0 |
| | B35 | A16 | 98 | 650 | 12 | −30 | 740 | 15 | Hot-dip plating | 3.0 |
| | B36 | A21 | 98 | 650 | 12 | −30 | 740 | 15 | Hot-dip plating | 3.0 |
| | B37 | A27 | 98 | 650 | 12 | −30 | 740 | 15 | Hot-dip plating | 3.0 |
| | B38 | A28 | 98 | 650 | 12 | −30 | 740 | 15 | Hot-dip plating | 3.0 |
| | B39 | A29 | 98 | 650 | 12 | −30 | 740 | 15 | Hot-dip plating | 3.0 |
| | B40 | A30 | 98 | 650 | 12 | −30 | 740 | 15 | Hot-dip plating | 3.0 |
| | B41 | A31 | 98 | 650 | 12 | −30 | 740 | 15 | Hot-dip plating | 3.0 |
| | B42 | A27 | 98 | 650 | 12 | 5 | 760 | 60 | Hot-dip plating | 10.0 |
| | B43 | A28 | 98 | 650 | 12 | 5 | 760 | 60 | Hot-dip plating | 10.0 |
| | B44 | A29 | 98 | 650 | 12 | 5 | 760 | 60 | Hot-dip plating | 10.0 |
| | B45 | A30 | 98 | 650 | 12 | 5 | 760 | 60 | Hot-dip plating | 10.0 |
| | B46 | A31 | 98 | 650 | 12 | 5 | 760 | 60 | Hot-dip plating | 10.0 |

TABLE 7-continued

|  |  |  | Coated steel sheet | | | Production conditions | |
|---|---|---|---|---|---|---|---|
|  |  |  | Amount of Si + Ni in upper layer (mass %) | C content in surface layer of steel sheet (mass %) | Maximum Cr content in lower layer (mass %) | Heat treatment | |
|  |  | Symbol |  |  |  | Temperature rising rate (° C./s) | Heating temperature (° C.) |
| Invention Example | | B24 | 9.0 | 0.31 | 0.00 | 5 | 920 |
| | | B25 | 9.0 | 0.20 | 0.00 | 5 | 920 |
| | | B26 | 8.5 | 0.22 | 0.00 | 5 | 920 |
| | | B27 | 8.7 | 0.20 | 0.35 | 5 | 920 |
| | | B28 | 8.9 | 0.21 | 0.16 | 5 | 920 |
| | | B29 | 8.9 | 0.26 | 0.12 | 5 | 920 |
| | | B30 | 8.8 | 0.38 | 0.11 | 5 | 920 |
| | | B31 | 8.7 | 0.26 | 0.33 | 5 | 920 |
| | | B32 | 2.0 | 0.16 | 0.28 | 5 | 920 |
| | | B33 | 2.0 | 0.30 | 0.22 | 5 | 920 |
| | | B34 | 2.1 | 0.17 | 0.25 | 5 | 920 |
| | | B35 | 2.0 | 0.19 | 0.75 | 5 | 920 |
| | | B36 | 2.0 | 0.26 | 0.33 | 5 | 920 |
| | | B37 | 2.1 | 0.19 | 0.52 | 5 | 920 |
| | | B38 | 2.3 | 0.22 | 0.25 | 5 | 920 |
| | | B39 | 2.2 | 0.25 | 0.25 | 5 | 920 |
| | | B40 | 1.9 | 0.36 | 0.23 | 5 | 920 |
| | | B41 | 1.9 | 0.26 | 0.51 | 5 | 920 |
| | | B42 | 8.8 | 0.17 | 0.50 | 5 | 920 |
| | | B43 | 9.0 | 0.19 | 0.23 | 5 | 920 |
| | | B44 | 8.9 | 0.23 | 0.21 | 5 | 920 |
| | | B45 | 8.7 | 0.35 | 0.21 | 5 | 920 |
| | | B46 | 8.8 | 0.23 | 0.52 | 5 | 920 |

TABLE 8

|  |  |  | Production conditions Heat treatment | | Coated steel member | | | | | | |
|---|---|---|---|---|---|---|---|---|---|---|---|
|  |  |  | Cooling rate to Ms or lower (° C./s) | Upper critical cooling rate (° C./s) | Maximum C content in high Al content region (mass %) | Maximum C content in low Al content region (mass %) | Maximum C concentration in surface layer of steel sheet substrate (mass %) | Maximum Cr content in high Al content region (mass %) | Tensile strength (MPa) | Bending angle (°) | Impact value (J/cm²) |
|  | Symbol | Steel No. |  |  |  |  |  |  |  |  |  |
| Invention Example | B24 | A24 | 50 | 30 | 0.08 | 0.15 | 0.31 | 0.00 | 2432 | 56 | 25 |
| | B25 | A25 | 50 | 40 | 0.06 | 0.07 | 0.20 | 0.00 | 1778 | 71 | 44 |
| | B26 | A26 | 50 | 30 | 0.07 | 0.11 | 0.22 | 0.00 | 2007 | 62 | 38 |
| | B27 | A27 | 50 | 20 | 0.05 | 0.09 | 0.19 | 0.20 | 1712 | 70 | 52 |
| | B28 | A28 | 50 | 20 | 0.07 | 0.10 | 0.21 | 0.08 | 1763 | 66 | 48 |
| | B29 | A29 | 50 | 20 | 0.08 | 0.12 | 0.25 | 0.07 | 1968 | 62 | 39 |
| | B30 | A30 | 50 | 20 | 0.11 | 0.18 | 0.38 | 0.07 | 2642 | 55 | 26 |
| | B31 | A31 | 50 | 20 | 0.08 | 0.12 | 0.26 | 0.19 | 1749 | 66 | 47 |
| | B32 | A1 | 50 | 20 | 0.05 | 0.08 | 0.18 | 0.18 | 1703 | 70 | 53 |
| | B33 | A5 | 50 | 20 | 0.07 | 0.12 | 0.28 | 0.14 | 2267 | 57 | 29 |
| | B34 | A10 | 50 | 30 | 0.05 | 0.08 | 0.19 | 0.17 | 1735 | 68 | 46 |
| | B35 | A16 | 50 | 20 | 0.06 | 0.08 | 0.22 | 0.52 | 1842 | 65 | 46 |
| | B36 | A21 | 50 | 30 | 0.07 | 0.13 | 0.26 | 0.22 | 2210 | 58 | 29 |
| | B37 | A27 | 50 | 20 | 0.05 | 0.08 | 0.20 | 0.33 | 1711 | 71 | 53 |
| | B38 | A28 | 50 | 20 | 0.06 | 0.09 | 0.22 | 0.12 | 1765 | 67 | 47 |
| | B39 | A29 | 50 | 20 | 0.07 | 0.12 | 0.26 | 0.11 | 1970 | 62 | 40 |
| | B40 | A30 | 50 | 20 | 0.10 | 0.19 | 0.38 | 0.12 | 2644 | 55 | 25 |
| | B41 | A31 | 50 | 20 | 0.08 | 0.12 | 0.26 | 0.34 | 1751 | 65 | 48 |
| | B42 | A27 | 50 | 20 | 0.03 | 0.07 | 0.17 | 0.33 | 1696 | 81 | 54 |
| | B43 | A28 | 50 | 20 | 0.04 | 0.08 | 0.19 | 0.12 | 1755 | 72 | 49 |
| | B44 | A29 | 50 | 20 | 0.05 | 0.10 | 0.23 | 0.11 | 1959 | 66 | 40 |
| | B45 | A30 | 50 | 20 | 0.07 | 0.16 | 0.36 | 0.11 | 2635 | 59 | 27 |
| | B46 | A31 | 50 | 20 | 0.05 | 0.10 | 0.23 | 0.34 | 1752 | 69 | 47 |

TABLE 9

| | | | Production conditions | | | | | | | |
|---|---|---|---|---|---|---|---|---|---|---|
| | | | Hot-rolled sheet annealing | | | Annealing | | | | |
| | | | N₂ | | | Dew | | | Coating | |
| | Symbol | Steel No. | concentration % | Temperature ° C. | Time hr | point ° C. | Temperature ° C. | Time sec | Kind — | Si + Ni (mass %) |
| Comparative Example | b1 | a1 | — | — | — | −30 | 740 | 15 | Hot-dip plating | 3.0 |
| | b2 | a2 | — | — | — | −30 | 740 | 15 | Hot-dip plating | 3.0 |
| | b3 | a3 | — | — | — | −30 | 740 | 15 | Hot-dip plating | 3.0 |
| | b4 | a4 | — | — | — | −30 | 740 | 15 | Hot-dip plating | 3.0 |
| | b5 | a5 | — | — | — | −30 | 740 | 15 | Hot-dip plating | 3.0 |
| | b6 | a6 | — | — | — | −30 | 740 | 15 | Hot-dip plating | 3.0 |
| | b7 | a7 | — | — | — | −30 | 740 | 15 | Hot-dip plating | 3.0 |
| | b8 | a8 | — | — | — | −30 | 740 | 15 | Hot-dip plating | 3.0 |
| | b9 | a9 | — | — | — | −30 | 740 | 15 | Hot-dip plating | 3.0 |
| | b10 | a10 | — | — | — | −30 | 740 | 15 | Hot-dip plating | 3.0 |
| | b11 | a11 | — | — | — | −30 | 740 | 15 | Hot-dip plating | 3.0 |
| | b12 | a12 | — | — | — | −30 | 740 | 15 | Hot-dip plating | 3.0 |
| | b13 | a13 | — | — | — | −30 | 740 | 15 | Hot-dip plating | 3.0 |
| | b14 | a14 | — | — | — | −30 | 740 | 15 | Hot-dip plating | 3.0 |
| | b15 | a15 | — | — | — | −30 | 740 | 15 | Hot-dip plating | 3.0 |
| | b16 | a16 | — | — | — | −30 | 740 | 15 | Hot-dip plating | 3.0 |
| | b17 | a17 | — | — | — | −30 | 740 | 15 | Hot-dip plating | 3.0 |
| | b18 | a18 | — | — | — | −30 | 740 | 15 | Hot-dip plating | 3.0 |
| | b19 | a19 | — | — | — | −30 | 740 | 15 | Hot-dip plating | 3.0 |
| | b20 | A27 | — | — | — | −30 | 740 | 15 | Hot-dip plating | 3.0 |
| | b21 | A28 | — | — | — | −30 | 740 | 15 | Hot-dip plating | 3.0 |
| | b22 | A29 | — | — | — | −30 | 740 | 15 | Hot-dip plating | 3.0 |
| | b23 | A30 | — | — | — | −30 | 740 | 15 | Hot-dip plating | 3.0 |
| | b24 | A31 | — | — | — | −30 | 740 | 15 | Hot-dip plating | 3.0 |
| | b25 | A27 | — | — | — | 5 | 760 | 60 | Hot-dip plating | 3.0 |
| | b26 | A28 | — | — | — | 5 | 760 | 60 | Hot-dip plating | 3.0 |
| | b27 | A29 | — | — | — | 5 | 760 | 60 | Hot-dip plating | 3.0 |
| | b28 | A30 | — | — | — | 5 | 760 | 60 | Hot-dip plating | 3.0 |
| | b29 | A31 | — | — | — | 5 | 760 | 60 | Hot-dip plating | 3.0 |
| | b30 | A27 | — | — | — | −30 | 740 | 15 | Hot-dip plating | 10.0 |
| | b31 | A28 | — | — | — | −30 | 740 | 15 | Hot-dip plating | 10.0 |
| | b32 | A29 | — | — | — | −30 | 740 | 15 | Hot-dip plating | 10.0 |
| | b33 | A30 | — | — | — | −30 | 740 | 15 | Hot-dip plating | 10.0 |
| | b34 | A31 | — | — | — | −30 | 740 | 15 | Hot-dip plating | 10.0 |
| | b35 | a2 | 98 | 650 | 12 | 5 | 760 | 60 | Hot-dip plating | 10.0 |
| | b36 | a6 | 98 | 650 | 12 | 5 | 760 | 60 | Hot-dip plating | 10.0 |
| | b37 | a8 | 98 | 650 | 12 | 5 | 760 | 60 | Hot-dip plating | 10.0 |

| | | Coated steel sheet | | | Production conditions | |
|---|---|---|---|---|---|---|
| | | Amount of Si + | C content in | Maximum Cr | Heat treatment | |
| | Symbol | Ni in upper layer (mass %) | surface layer of steel sheet (mass %) | content in lower layer (mass %) | Temperature rising rate (° C./s) | Heating temperature (° C.) |
| Comparative Example | b1 | 2.2 | 0.11 | 0.29 | 5 | 920 |
| | b2 | 2.1 | 0.88 | 0.09 | 5 | 920 |
| | b3 | 2.3 | 0.28 | 0.22 | 5 | 920 |
| | b4 | 2.2 | 0.42 | 0.45 | 5 | 920 |
| | b5 | 2.2 | 0.34 | 0.00 | 5 | 920 |
| | b6 | 2.3 | 0.36 | 0.00 | 5 | 920 |
| | b7 | 2.4 | 0.36 | 0.00 | 5 | 920 |
| | b8 | 2.2 | 0.42 | 0.49 | 5 | 920 |
| | b9 | 2.2 | 0.37 | 0.00 | 5 | 920 |
| | b10 | 2.1 | 0.43 | 0.00 | 5 | 920 |
| | b11 | 2.1 | 0.33 | 0.00 | 5 | 920 |
| | b12 | 2.3 | 0.32 | 0.31 | 5 | 920 |
| | b13 | 2.4 | 0.39 | 0.00 | 5 | 920 |
| | b14 | 2.1 | 0.34 | 0.00 | 5 | 920 |
| | b15 | 2.0 | 0.35 | 0.00 | 5 | 920 |
| | b16 | 2.0 | 0.40 | 2.30 | 5 | 920 |
| | b17 | 2.0 | 0.40 | 0.00 | 5 | 920 |
| | b18 | 2.1 | 0.37 | 0.00 | 5 | 920 |
| | b19 | 1.9 | 0.41 | 0.22 | 5 | 920 |
| | b20 | 2.0 | 0.27 | 0.40 | 5 | 920 |
| | b21 | 2.2 | 0.29 | 0.15 | 5 | 920 |
| | b22 | 2.1 | 0.34 | 0.12 | 5 | 920 |
| | b23 | 1.9 | 0.49 | 0.13 | 5 | 920 |
| | b24 | 2.0 | 0.34 | 0.40 | 5 | 920 |
| | b25 | 2.1 | 0.19 | 0.38 | 5 | 920 |

TABLE 9-continued

| | | | | | |
|---|---|---|---|---|---|
| b26 | 2.1 | 0.21 | 0.15 | 5 | 920 |
| b27 | 2.0 | 0.25 | 0.12 | 5 | 920 |
| b28 | 1.9 | 0.38 | 0.12 | 5 | 920 |
| b29 | 2.0 | 0.25 | 0.37 | 5 | 920 |
| b30 | 8.7 | 0.26 | 0.39 | 5 | 920 |
| b31 | 8.8 | 0.28 | 0.14 | 5 | 920 |
| b32 | 8.9 | 0.33 | 0.11 | 5 | 920 |
| b33 | 8.8 | 0.48 | 0.12 | 5 | 920 |
| b34 | 8.7 | 0.33 | 0.39 | 5 | 920 |
| b35 | 8.8 | 0.64 | 0.28 | 5 | 920 |
| b36 | 9.0 | 0.25 | 0.00 | 5 | 920 |
| b37 | 8.9 | 0.27 | 0.60 | 5 | 920 |

TABLE 10

| | | | Coated steel member | | | | | | | |
|---|---|---|---|---|---|---|---|---|---|---|
| | | | Production conditions Heat treatment | | Maximum C content in | Maximum C content in | Maximum C concentration in surface | Maximum Cr | | | |
| | Symbol | Steel No. | Cooling rate to Ms or lower (° C./s) | Upper critical cooling rate (° C./s) | high Al content region (mass %) | low Al content region (mass %) | layer of steel sheet substrate (mass %) | content in high Al content region (mass %) | Tensile strength (MPa) | Bending angle (°) | Impact value (J/cm²) |
| Comparative Example | b1 | a1 | 50 | 40 | 0.07 | 0.09 | 0.12 | 0.15 | 964 | 92 | 90 |
| | b2 | a2 | 50 | 10 | 0.26 | 0.41 | 0.88 | 0.04 | 2720 | 30 | 16 |
| | b3 | a3 | 50 | 70 | 0.13 | 0.16 | 0.28 | 0.12 | 1121 | 85 | 84 |
| | b4 | a4 | 50 | 20 | 0.15 | 0.23 | 0.43 | 0.24 | 2518 | 35 | 15 |
| | b5 | a5 | 50 | 100 | 0.14 | 0.18 | 0.35 | 0.00 | 1070 | 87 | 88 |
| | b6 | a6 | 50 | 10 | 0.16 | 0.20 | 0.36 | 0.00 | 2380 | 28 | 8 |
| | b7 | a7 | 50 | 30 | 0.14 | 0.19 | 0.37 | 0.00 | 2131 | 39 | 9 |
| | b8 | a8 | 50 | 30 | 0.15 | 0.23 | 0.41 | 0.28 | 2353 | 29 | 12 |
| | b9 | a9 | 50 | 20 | 0.13 | 0.21 | 0.37 | 0.00 | 2168 | 38 | 16 |
| | b10 | a10 | 50 | 50 | 0.15 | 0.24 | 0.43 | 0.00 | 2447 | 35 | 18 |
| | b11 | a11 | 50 | 30 | 0.14 | 0.19 | 0.32 | 0.00 | 1150 | 85 | 85 |
| | b12 | a12 | 50 | 50 | 0.15 | 0.19 | 0.32 | 0.18 | 1926 | 43 | 25 |
| | b13 | a13 | 50 | 20 | 0.15 | 0.21 | 0.39 | 0.00 | 2210 | 38 | 14 |
| | b14 | a14 | 50 | 20 | 0.13 | 0.19 | 0.34 | 0.00 | 2044 | 40 | 28 |
| | b15 | a15 | 50 | 50 | 0.14 | 0.21 | 0.34 | 0.00 | 2038 | 39 | 27 |
| | b16 | a16 | 50 | 20 | 0.16 | 0.21 | 0.39 | 1.30 | 2292 | 38 | 18 |
| | b17 | a17 | 50 | 10 | 0.16 | 0.22 | 0.40 | 0.00 | 2310 | 36 | 17 |
| | b18 | a18 | 50 | 30 | 0.14 | 0.21 | 0.37 | 0.00 | 2188 | 38 | 15 |
| | b19 | a19 | 50 | 20 | 0.15 | 0.23 | 0.39 | 0.14 | 2304 | 37 | 14 |
| | b20 | A27 | 50 | 20 | 0.14 | 0.16 | 0.27 | 0.26 | 1750 | 50 | 50 |
| | b21 | A28 | 50 | 20 | 0.15 | 0.18 | 0.29 | 0.08 | 1809 | 49 | 48 |
| | b22 | A29 | 50 | 20 | 0.17 | 0.20 | 0.34 | 0.07 | 1998 | 44 | 40 |
| | b23 | A30 | 50 | 20 | 0.25 | 0.32 | 0.50 | 0.07 | 2678 | 38 | 25 |
| | b24 | A31 | 50 | 20 | 0.18 | 0.20 | 0.34 | 0.07 | 2012 | 42 | 38 |
| | b25 | A27 | 50 | 20 | 0.11 | 0.13 | 0.20 | 0.26 | 1732 | 58 | 51 |
| | b26 | A28 | 50 | 20 | 0.11 | 0.14 | 0.22 | 0.07 | 1790 | 57 | 50 |
| | b27 | A29 | 50 | 20 | 0.11 | 0.17 | 0.26 | 0.06 | 1989 | 53 | 42 |
| | b28 | A30 | 50 | 20 | 0.15 | 0.25 | 0.38 | 0.06 | 2659 | 47 | 27 |
| | b29 | A31 | 50 | 20 | 0.12 | 0.17 | 0.26 | 0.06 | 2001 | 51 | 40 |
| | b30 | A27 | 50 | 20 | 0.13 | 0.17 | 0.26 | 0.25 | 1746 | 51 | 49 |
| | b31 | A28 | 50 | 20 | 0.16 | 0.17 | 0.28 | 0.08 | 1805 | 48 | 50 |
| | b32 | A29 | 50 | 20 | 0.16 | 0.21 | 0.33 | 0.06 | 1993 | 45 | 40 |
| | b33 | A30 | 50 | 20 | 0.24 | 0.34 | 0.48 | 0.06 | 2665 | 39 | 26 |
| | b34 | A31 | 50 | 20 | 0.16 | 0.22 | 0.33 | 0.06 | 2008 | 44 | 39 |
| | b35 | a2 | 50 | 10 | 0.21 | 0.34 | 0.69 | 0.09 | 2680 | 44 | 17 |
| | b36 | a6 | 50 | 10 | 0.07 | 0.12 | 0.28 | 0.00 | 2346 | 48 | 10 |
| | b37 | a8 | 50 | 30 | 0.08 | 0.14 | 0.29 | 0.36 | 2320 | 46 | 12 |

As shown in Tables 5 to 10, Invention Examples B1 to B46 satisfying the ranges of the present invention obtained good results in terms of both the structure and properties, but Comparative Examples b1 to b37 not satisfying the ranges of the present invention obtained results not satisfying at least one of the structure and properties.

Example 2

Among the kinds of steel shown in Tables 1 to 4, slabs having the steel compositions of Steel Nos. A27 to A31 were hot-rolled to obtain hot-rolled steel sheets having a thickness of 2.7 mm. The hot-rolled steel sheets were subjected to hot-rolled sheet annealing and annealing as shown in Tables 9 to 10 and further subjected to plating by being immersed in an Al plating bath containing Si and Ni shown in Tables 11 and 12 to obtain coated steel sheets.

In the obtained coated steel sheets, as in Example 1, GDS was used to determine the lower layer containing 3 mass % or more and less than 70 mass % of Al and the upper layer containing 70 mass % or more and 95 mass % or less of Al, and the total amount of Si and Ni in the upper layer, the maximum C content in the range from the surface of the steel sheet to the depth of 20 μm, and the Cr content in the lower layer were evaluated. The evaluation results are shown in Tables 9 and 10.

TABLE 11

| | | | Production conditions | | | | | | Coated steel sheet | | |
| | | | Hot-rolled sheet annealing | | | Annealing | | | Amount of Si + Ni | Maximum C content in | Cr content |
| | Symbol | Steel No. | N₂ concentration % | Temperature °C. | Time hr | Dew point °C. | Temperature °C. | Time sec | Coating Si + Al (mass %) | in upper layer (mass %) | surface layer of steel sheet (mass %) | in lower layer (mass %) |
|---|---|---|---|---|---|---|---|---|---|---|---|---|
| Invention Example | D1 | A27 | — | — | — | 5 | 760 | 60 | 10.0 | 8.7 | 0.20 | 0.35 |
| | D2 | A27 | 50 | 350 | 3 | 2 | 840 | 100 | 12.0 | 10.2 | 0.19 | 0.34 |
| | D3 | A27 | 98 | 650 | 12 | 5 | 760 | 60 | 3.0 | 2.0 | 0.18 | 0.51 |
| | D4 | A27 | 95 | 700 | 7 | 2 | 840 | 100 | 2.0 | 1.2 | 0.17 | 0.50 |
| | D5 | A27 | 98 | 650 | 15 | −30 | 740 | 15 | 3.0 | 2.1 | 0.19 | 0.52 |
| | D6 | A27 | 95 | 680 | 10 | −20 | 800 | 20 | 2.0 | 1.1 | 0.20 | 0.54 |
| | D7 | A27 | 98 | 650 | 12 | −30 | 740 | 15 | 10.0 | 8.8 | 0.20 | 0.50 |
| | D8 | A27 | 96 | 700 | 8 | −15 | 720 | 20 | 12.5 | 10.8 | 0.19 | 0.48 |
| | D9 | A27 | 95 | 780 | 6 | −20 | 750 | 20 | 9.5 | 8.2 | 0.18 | 0.51 |
| | D10 | A27 | 98 | 650 | 12 | 5 | 760 | 60 | 10.0 | 8.8 | 0.17 | 0.50 |
| | D11 | A27 | 98 | 700 | 8 | 2 | 770 | 50 | 10.0 | 8.9 | 0.17 | 0.52 |
| | D12 | A27 | 98 | 650 | 20 | — | — | — | 10.0 | 8.8 | 0.21 | 0.58 |
| | D13 | A28 | — | — | — | 5 | 760 | 60 | 10.0 | 8.9 | 0.21 | 0.16 |
| | D14 | A28 | 98 | 650 | 12 | 5 | 760 | 60 | 3.0 | 2.1 | 0.20 | 0.25 |
| | D15 | A28 | 98 | 650 | 12 | −30 | 740 | 15 | 3.0 | 2.3 | 0.22 | 0.25 |
| | D16 | A28 | 98 | 650 | 12 | −30 | 740 | 15 | 10.0 | 8.8 | 0.22 | 0.23 |
| | D17 | A28 | 95 | 780 | 6 | −20 | 750 | 20 | 9.5 | 8.3 | 0.20 | 0.25 |
| | D18 | A28 | 98 | 650 | 12 | 5 | 760 | 60 | 10.0 | 9.0 | 0.19 | 0.23 |
| | D19 | A28 | 98 | 650 | 20 | — | — | — | 10.0 | 8.8 | 0.22 | 0.30 |
| | D20 | A29 | — | — | — | 5 | 760 | 60 | 10.0 | 8.9 | 0.26 | 0.12 |
| | D21 | A29 | 98 | 650 | 12 | 5 | 760 | 60 | 3.0 | 2.2 | 0.24 | 0.24 |
| | D22 | A29 | 98 | 650 | 12 | −30 | 740 | 15 | 3.0 | 2.0 | 0.25 | 0.25 |
| | D23 | A29 | 98 | 650 | 12 | −30 | 740 | 15 | 10.0 | 8.8 | 0.25 | 0.22 |
| | D24 | A29 | 95 | 780 | 6 | −20 | 750 | 20 | 9.5 | 8.3 | 0.24 | 0.24 |
| | D25 | A29 | 98 | 650 | 12 | 5 | 760 | 60 | 10.0 | 8.9 | 0.23 | 0.21 |
| | D26 | A29 | 98 | 650 | 20 | — | — | — | 10.0 | 8.8 | 0.26 | 0.28 |
| | D27 | A30 | — | — | — | 5 | 760 | 60 | 10.0 | 8.8 | 0.38 | 0.11 |
| | D28 | A30 | 98 | 650 | 12 | 5 | 760 | 60 | 3.0 | 2.1 | 0.35 | 0.23 |
| | D29 | A30 | 98 | 650 | 12 | −30 | 740 | 15 | 3.0 | 1.9 | 0.36 | 0.23 |
| | D30 | A30 | 98 | 650 | 12 | −30 | 740 | 15 | 10.0 | 8.8 | 0.37 | 0.22 |
| | D31 | A30 | 95 | 780 | 6 | −20 | 750 | 20 | 9.5 | 8.2 | 0.36 | 0.24 |
| | D32 | A30 | 98 | 650 | 12 | 5 | 760 | 60 | 10.0 | 8.7 | 0.35 | 0.21 |
| | D33 | A30 | 98 | 650 | 20 | — | — | — | 10.0 | 8.8 | 0.38 | 0.30 |
| | D34 | A31 | — | — | — | 5 | 760 | 60 | 10.0 | 8.7 | 0.26 | 0.33 |
| | D35 | A31 | 98 | 650 | 12 | 5 | 760 | 60 | 3.0 | 2.1 | 0.24 | 0.50 |
| | D36 | A31 | 98 | 650 | 12 | −30 | 740 | 15 | 3.0 | 1.9 | 0.26 | 0.51 |
| | D37 | A31 | 98 | 650 | 12 | −30 | 740 | 15 | 10.0 | 8.7 | 0.25 | 0.49 |
| | D38 | A31 | 95 | 780 | 6 | −20 | 750 | 20 | 9.5 | 8.3 | 0.24 | 0.51 |
| | D39 | A31 | 98 | 650 | 12 | 5 | 760 | 60 | 10.0 | 8.8 | 0.23 | 0.52 |
| | D40 | A31 | 98 | 650 | 20 | — | — | — | 10.0 | 8.7 | 0.26 | 0.59 |

TABLE 12

| | | | Production conditions | | | | | | Coated steel sheet | | |
|---|---|---|---|---|---|---|---|---|---|---|---|
| | | | Hot-rolled sheet annealing | | | Annealing | | | | Amount of Si + Ni in upper layer (mass %) | Maximum C content in surface layer of steel sheet (mass %) | Cr content in lower layer (mass %) |
| | Symbol | Steel No. | N₂ concentration % | Temperature ° C. | Time hr | Dew point ° C. | Temperature ° C. | Time sec | Coating Si + Ni (mass %) | | | |
| Comparative Example | d1 | A27 | — | — | — | −30 | 740 | 15 | 3.0 | 2.0 | 0.27 | 0.40 |
| | d2 | A27 | 50 | 350 | 3 | −30 | 680 | 0 | 2.0 | 1.2 | 0.26 | 0.40 |
| | d3 | A27 | — | — | — | 5 | 720 | 60 | 3.0 | 2.1 | 0.19 | 0.38 |
| | d4 | A27 | 50 | 350 | 3 | 2 | 740 | 100 | 2.0 | 1.1 | 0.20 | 0.34 |
| | d5 | A27 | — | — | — | −30 | 720 | 15 | 10.0 | 8.7 | 0.26 | 0.39 |
| | d6 | A27 | 50 | 350 | 3 | −15 | 680 | 0 | 12.0 | 11.0 | 0.26 | 0.40 |
| | d7 | A27 | 50 | 550 | 7 | −30 | 740 | 15 | 3.0 | 2.0 | 0.25 | 0.41 |
| | d8 | A27 | 90 | 350 | 7 | −30 | 740 | 15 | 3.0 | 2.0 | 0.25 | 0.42 |
| | d9 | A27 | 90 | 550 | 3 | −30 | 740 | 15 | 3.0 | 2.0 | 0.24 | 0.42 |
| | d10 | A28 | — | — | — | −30 | 740 | 15 | 3.0 | 2.2 | 0.29 | 0.15 |
| | d11 | A28 | — | — | — | 5 | 760 | 60 | 3.0 | 2.1 | 0.21 | 0.15 |
| | d12 | A28 | — | — | — | −30 | 740 | 15 | 10.0 | 8.8 | 0.28 | 0.14 |
| | d13 | A28 | 50 | 550 | 7 | −30 | 740 | 15 | 3.0 | 2.1 | 0.28 | 0.15 |
| | d14 | A28 | 90 | 350 | 7 | −30 | 740 | 15 | 3.0 | 2.1 | 0.28 | 0.15 |
| | d15 | A28 | 90 | 550 | 3 | −30 | 740 | 15 | 3.0 | 2.1 | 0.27 | 0.16 |
| | d16 | A29 | — | — | — | −30 | 740 | 15 | 3.0 | 2.1 | 0.34 | 0.12 |
| | d17 | A29 | — | — | — | 5 | 760 | 60 | 3.0 | 2.0 | 0.25 | 0.12 |
| | d18 | A29 | — | — | — | −30 | 740 | 15 | 10.0 | 8.9 | 0.33 | 0.11 |
| | d19 | A29 | 50 | 550 | 7 | −30 | 740 | 15 | 3.0 | 2.1 | 0.32 | 0.12 |
| | d20 | A29 | 90 | 350 | 7 | −30 | 740 | 15 | 3.0 | 2.1 | 0.33 | 0.13 |
| | d21 | A29 | 90 | 550 | 3 | −30 | 740 | 15 | 3.0 | 2.1 | 0.32 | 0.12 |
| | d22 | A30 | — | — | — | −30 | 740 | 15 | 3.0 | 1.9 | 0.49 | 0.13 |
| | d23 | A30 | — | — | — | 5 | 760 | 60 | 3.0 | 1.9 | 0.38 | 0.12 |
| | d24 | A30 | — | — | — | −30 | 740 | 15 | 10.0 | 8.8 | 0.48 | 0.12 |
| | d25 | A30 | 50 | 550 | 7 | −30 | 740 | 15 | 3.0 | 1.9 | 0.46 | 0.13 |
| | d26 | A30 | 90 | 350 | 7 | −30 | 740 | 15 | 3.0 | 1.9 | 0.47 | 0.12 |
| | d27 | A30 | 90 | 550 | 3 | −30 | 740 | 15 | 3.0 | 1.9 | 0.47 | 0.13 |
| | d28 | A31 | — | — | — | −30 | 740 | 15 | 3.0 | 2.0 | 0.34 | 0.40 |
| | d29 | A31 | — | — | — | 5 | 760 | 60 | 3.0 | 2.0 | 0.25 | 0.37 |
| | d30 | A31 | — | — | — | −30 | 740 | 15 | 10.0 | 8.7 | 0.33 | 0.39 |
| | d31 | A31 | 50 | 550 | 7 | −30 | 740 | 15 | 3.0 | 1.9 | 0.33 | 0.40 |
| | d32 | A31 | 90 | 350 | 7 | −30 | 740 | 15 | 3.0 | 1.9 | 0.32 | 0.41 |
| | d33 | A31 | 90 | 550 | 3 | −30 | 740 | 15 | 3.0 | 2.0 | 0.33 | 0.42 |

As can be seen from Tables 11 to 12, in Invention Examples D1 to D40 satisfying the ranges of the present invention, coated steel sheets having a predetermined chemical composition and a structure were obtained. On the other hand, Comparative Examples d1 to d33 not satisfying the ranges of the present invention obtained results not satisfying at least one of the target structures.

Example 3

The coated steel sheets shown in Tables 13 to 16 were subjected to the heat treatments shown in Tables 13 to 16 to produce coated steel members (E1 to E35 and e1 to e45).

The obtained coated steel members were cut out and subjected to glow discharge emission analysis (GDS), a tensile test, a bending test, and a Charpy impact test by the following methods in the same method as in Example 1, and the maximum C content in the coating region containing 30% or more of Al, the maximum C content in the region containing 3 mass % or more and less than 30 mass % of Al, the maximum C content in the range from the surface of the steel sheet substrate to the depth of 10 μm, the maximum Cr content in the high Al content region, tensile strength, bending angle, and impact value were evaluated. The evaluation results are shown in Tables 13 to 16.

TABLE 13

| | | | Coated steel sheet | | | Production conditions | | |
|---|---|---|---|---|---|---|---|---|
| | | | | Maximum C content | | Heat treatment | | |
| | Symbol | Steel No. | Amount of Si + Ni in upper layer (mass %) | in surface layer of steel sheet (mass %) | Cr content in lower layer (mass %) | Temperature rising rate (° C./s) | Heating temperature (° C.) | Cooling rate to Ms or lower (° C./s) |
| Invention Example | E1 | A27 | 8.7 | 0.20 | 0.35 | 5 | 920 | 50 |
| | E2 | A27 | 10.2 | 0.19 | 0.34 | 5 | 920 | 50 |
| | E3 | A27 | 2.0 | 0.18 | 0.51 | 5 | 920 | 50 |
| | E4 | A27 | 1.2 | 0.17 | 0.50 | 5 | 920 | 50 |
| | E5 | A27 | 2.1 | 0.19 | 0.52 | 5 | 920 | 50 |

TABLE 13-continued

<table>
<tr><th rowspan="3">Symbol</th><th rowspan="3">Steel No.</th><th colspan="3">Coated steel sheet</th><th colspan="3">Production conditions</th></tr>
<tr><th colspan="3">Maximum C content</th><th colspan="3">Heat treatment</th></tr>
<tr><th>Amount of Si + Ni in upper layer (mass %)</th><th>in surface layer of steel sheet (mass %)</th><th>Cr content in lower layer (mass %)</th><th>Temperature rising rate (° C./s)</th><th>Heating temperature (° C.)</th><th>Cooling rate to Ms or lower (° C./s)</th></tr>
<tr><td>E6</td><td>A27</td><td>1.1</td><td>0.20</td><td>0.54</td><td>5</td><td>920</td><td>50</td></tr>
<tr><td>E7</td><td>A27</td><td>8.8</td><td>0.20</td><td>0.50</td><td>5</td><td>920</td><td>50</td></tr>
<tr><td>E8</td><td>A27</td><td>10.8</td><td>0.19</td><td>0.48</td><td>5</td><td>920</td><td>50</td></tr>
<tr><td>E9</td><td>A27</td><td>8.2</td><td>0.18</td><td>0.51</td><td>5</td><td>920</td><td>50</td></tr>
<tr><td>E10</td><td>A27</td><td>8.8</td><td>0.17</td><td>0.50</td><td>5</td><td>920</td><td>50</td></tr>
<tr><td>E11</td><td>A27</td><td>8.9</td><td>0.17</td><td>0.52</td><td>5</td><td>920</td><td>50</td></tr>
<tr><td>E12</td><td>A28</td><td>8.9</td><td>0.21</td><td>0.16</td><td>5</td><td>920</td><td>50</td></tr>
<tr><td>E13</td><td>A28</td><td>2.1</td><td>0.20</td><td>0.25</td><td>5</td><td>920</td><td>50</td></tr>
<tr><td>E14</td><td>A28</td><td>2.3</td><td>0.22</td><td>0.25</td><td>5</td><td>920</td><td>50</td></tr>
<tr><td>E15</td><td>A28</td><td>8.8</td><td>0.22</td><td>0.23</td><td>5</td><td>920</td><td>50</td></tr>
<tr><td>E16</td><td>A28</td><td>8.3</td><td>0.20</td><td>0.25</td><td>5</td><td>920</td><td>50</td></tr>
<tr><td>E17</td><td>A28</td><td>9.0</td><td>0.19</td><td>0.23</td><td>5</td><td>920</td><td>50</td></tr>
<tr><td>E18</td><td>A29</td><td>8.9</td><td>0.26</td><td>0.12</td><td>5</td><td>920</td><td>50</td></tr>
<tr><td>E19</td><td>A29</td><td>2.2</td><td>0.24</td><td>0.24</td><td>5</td><td>920</td><td>50</td></tr>
<tr><td>E20</td><td>A29</td><td>2.0</td><td>0.25</td><td>0.25</td><td>5</td><td>920</td><td>50</td></tr>
<tr><td>E21</td><td>A29</td><td>8.8</td><td>0.25</td><td>0.22</td><td>5</td><td>920</td><td>50</td></tr>
<tr><td>E22</td><td>A29</td><td>8.3</td><td>0.24</td><td>0.24</td><td>5</td><td>920</td><td>50</td></tr>
<tr><td>E23</td><td>A29</td><td>8.9</td><td>0.23</td><td>0.21</td><td>5</td><td>920</td><td>50</td></tr>
<tr><td>E24</td><td>A30</td><td>8.8</td><td>0.38</td><td>0.11</td><td>5</td><td>920</td><td>50</td></tr>
<tr><td>E25</td><td>A30</td><td>2.1</td><td>0.36</td><td>0.23</td><td>5</td><td>920</td><td>50</td></tr>
<tr><td>E26</td><td>A30</td><td>1.9</td><td>0.38</td><td>0.24</td><td>5</td><td>920</td><td>50</td></tr>
<tr><td>E27</td><td>A30</td><td>8.8</td><td>0.37</td><td>0.22</td><td>5</td><td>920</td><td>50</td></tr>
<tr><td>E28</td><td>A30</td><td>8.2</td><td>0.36</td><td>0.24</td><td>5</td><td>920</td><td>50</td></tr>
<tr><td>E29</td><td>A30</td><td>8.7</td><td>0.35</td><td>0.21</td><td>5</td><td>920</td><td>50</td></tr>
<tr><td>E30</td><td>A31</td><td>8.7</td><td>0.26</td><td>0.33</td><td>5</td><td>920</td><td>50</td></tr>
<tr><td>E31</td><td>A31</td><td>2.1</td><td>0.24</td><td>0.50</td><td>5</td><td>920</td><td>50</td></tr>
<tr><td>E32</td><td>A31</td><td>1.9</td><td>0.26</td><td>0.51</td><td>5</td><td>920</td><td>50</td></tr>
<tr><td>E33</td><td>A31</td><td>8.7</td><td>0.25</td><td>0.49</td><td>5</td><td>920</td><td>50</td></tr>
<tr><td>E34</td><td>A31</td><td>8.3</td><td>0.24</td><td>0.51</td><td>5</td><td>920</td><td>50</td></tr>
<tr><td>E35</td><td>A31</td><td>8.8</td><td>0.23</td><td>0.52</td><td>5</td><td>920</td><td>50</td></tr>
</table>

TABLE 14

<table>
<tr><th></th><th>Symbol</th><th>Steel No.</th><th colspan="7">Coated steel member</th></tr>
<tr><th></th><th></th><th></th><th>Maximum C content in high Al content region (mass %)</th><th>Maximum C content in low Al content region (mass %)</th><th>Maximum C content in surface layer area of steel sheet substrate (mass %)</th><th>Maximum Cr content in high Al content region (mass %)</th><th>Tensile strength (MPa)</th><th>Bending angle (°)</th><th>Impact value (J/cm²)</th></tr>
<tr><td>Invention Example</td><td>E1</td><td>A27</td><td>0.05</td><td>0.09</td><td>0.19</td><td>0.20</td><td>1712</td><td>70</td><td>52</td></tr>
<tr><td></td><td>E2</td><td>A27</td><td>0.05</td><td>0.10</td><td>0.18</td><td>0.19</td><td>1710</td><td>71</td><td>51</td></tr>
<tr><td></td><td>E3</td><td>A27</td><td>0.04</td><td>0.08</td><td>0.18</td><td>0.33</td><td>1703</td><td>77</td><td>53</td></tr>
<tr><td></td><td>E4</td><td>A27</td><td>0.05</td><td>0.07</td><td>0.20</td><td>0.34</td><td>1704</td><td>77</td><td>53</td></tr>
<tr><td></td><td>E5</td><td>A27</td><td>0.05</td><td>0.08</td><td>0.20</td><td>0.33</td><td>1711</td><td>71</td><td>53</td></tr>
<tr><td></td><td>E6</td><td>A27</td><td>0.04</td><td>0.08</td><td>0.19</td><td>0.35</td><td>1712</td><td>70</td><td>54</td></tr>
<tr><td></td><td>E7</td><td>A27</td><td>0.05</td><td>0.08</td><td>0.19</td><td>0.33</td><td>1710</td><td>70</td><td>52</td></tr>
<tr><td></td><td>E8</td><td>A27</td><td>0.04</td><td>0.08</td><td>0.20</td><td>0.34</td><td>1708</td><td>71</td><td>52</td></tr>
<tr><td></td><td>E9</td><td>A27</td><td>0.04</td><td>0.07</td><td>0.19</td><td>0.35</td><td>1709</td><td>72</td><td>52</td></tr>
<tr><td></td><td>E10</td><td>A27</td><td>0.03</td><td>0.07</td><td>0.17</td><td>0.33</td><td>1696</td><td>81</td><td>54</td></tr>
<tr><td></td><td>E11</td><td>A27</td><td>0.03</td><td>0.06</td><td>0.18</td><td>0.33</td><td>1699</td><td>80</td><td>53</td></tr>
<tr><td></td><td>E12</td><td>A28</td><td>0.07</td><td>0.10</td><td>0.21</td><td>0.08</td><td>1763</td><td>66</td><td>48</td></tr>
<tr><td></td><td>E13</td><td>A28</td><td>0.05</td><td>0.09</td><td>0.20</td><td>0.13</td><td>1758</td><td>69</td><td>48</td></tr>
<tr><td></td><td>E14</td><td>A28</td><td>0.06</td><td>0.09</td><td>0.22</td><td>0.12</td><td>1765</td><td>67</td><td>47</td></tr>
<tr><td></td><td>E15</td><td>A28</td><td>0.07</td><td>0.09</td><td>0.22</td><td>0.12</td><td>1765</td><td>66</td><td>47</td></tr>
<tr><td></td><td>E16</td><td>A28</td><td>0.06</td><td>0.09</td><td>0.21</td><td>0.13</td><td>1768</td><td>68</td><td>47</td></tr>
<tr><td></td><td>E17</td><td>A28</td><td>0.04</td><td>0.08</td><td>0.19</td><td>0.12</td><td>1755</td><td>72</td><td>49</td></tr>
<tr><td></td><td>E18</td><td>A29</td><td>0.08</td><td>0.12</td><td>0.25</td><td>0.07</td><td>1968</td><td>62</td><td>39</td></tr>
<tr><td></td><td>E19</td><td>A29</td><td>0.06</td><td>0.11</td><td>0.24</td><td>0.11</td><td>1961</td><td>64</td><td>40</td></tr>
<tr><td></td><td>E20</td><td>A29</td><td>0.07</td><td>0.12</td><td>0.26</td><td>0.11</td><td>1970</td><td>62</td><td>40</td></tr>
<tr><td></td><td>E21</td><td>A29</td><td>0.07</td><td>0.12</td><td>0.25</td><td>0.12</td><td>1968</td><td>62</td><td>40</td></tr>
<tr><td></td><td>E22</td><td>A29</td><td>0.07</td><td>0.11</td><td>0.24</td><td>0.12</td><td>1962</td><td>63</td><td>40</td></tr>
<tr><td></td><td>E23</td><td>A29</td><td>0.05</td><td>0.10</td><td>0.23</td><td>0.11</td><td>1959</td><td>66</td><td>40</td></tr>
<tr><td></td><td>E24</td><td>A30</td><td>0.11</td><td>0.18</td><td>0.38</td><td>0.07</td><td>2642</td><td>55</td><td>26</td></tr>
<tr><td></td><td>E25</td><td>A30</td><td>0.08</td><td>0.17</td><td>0.36</td><td>0.11</td><td>2639</td><td>57</td><td>27</td></tr>
<tr><td></td><td>E26</td><td>A30</td><td>0.10</td><td>0.19</td><td>0.38</td><td>0.12</td><td>2644</td><td>55</td><td>25</td></tr>
<tr><td></td><td>E27</td><td>A30</td><td>0.11</td><td>0.19</td><td>0.37</td><td>0.12</td><td>2640</td><td>55</td><td>26</td></tr>
</table>

TABLE 14-continued

| | | Coated steel member | | | | | | |
|---|---|---|---|---|---|---|---|---|
| Symbol | Steel No. | Maximum C content in high Al content region (mass %) | Maximum C content in low Al content region (mass %) | Maximum C content in surface layer area of steel sheet substrate (mass %) | Maximum Cr content in high Al content region (mass %) | Tensile strength (MPa) | Bending angle (°) | Impact value (J/cm$^2$) |
| E28 | A30 | 0.10 | 0.19 | 0.36 | 0.13 | 2650 | 56 | 27 |
| E29 | A30 | 0.07 | 0.16 | 0.36 | 0.11 | 2635 | 59 | 27 |
| E30 | A31 | 0.08 | 0.12 | 0.26 | 0.19 | 1749 | 66 | 47 |
| E31 | A31 | 0.06 | 0.11 | 0.24 | 0.34 | 1760 | 68 | 47 |
| E32 | A31 | 0.08 | 0.12 | 0.26 | 0.34 | 1751 | 65 | 48 |
| E33 | A31 | 0.07 | 0.12 | 0.25 | 0.35 | 1755 | 66 | 47 |
| E34 | A31 | 0.06 | 0.11 | 0.24 | 0.36 | 1750 | 67 | 47 |
| E35 | A31 | 0.05 | 0.10 | 0.23 | 0.34 | 1752 | 69 | 47 |

TABLE 15

| | | | Coated steel sheet | | | Production conditions | | |
|---|---|---|---|---|---|---|---|---|
| | | | | Maximum C content | | | Heat treatment | |
| | Symbol | Steel No. | Amount of Si + Ni in upper layer (mass %) | in surface layer of steel sheet (mass %) | Cr content in lower layer (mass %) | Temperature rising rate (° C./s) | Heating temperature (° C.) | Cooling rate to Ms or lower (° C./s) |
| Comparative Example | e1 | A27 | 8.7 | 0.20 | 0.35 | 0.5 | 1150 | 50 |
| | e2 | A27 | 10.2 | 0.19 | 0.34 | 0.5 | 1150 | 50 |
| | e3 | A27 | 2.0 | 0.18 | 0.51 | 0.5 | 1150 | 50 |
| | e4 | A27 | 1.2 | 0.17 | 0.50 | 0.5 | 1150 | 50 |
| | e5 | A27 | 2.1 | 0.19 | 0.52 | 0.5 | 1150 | 50 |
| | e6 | A27 | 1.1 | 0.20 | 0.54 | 0.5 | 1150 | 50 |
| | e7 | A27 | 8.8 | 0.20 | 0.50 | 0.5 | 1150 | 50 |
| | e8 | A27 | 10.8 | 0.19 | 0.48 | 0.5 | 1150 | 50 |
| | e9 | A27 | 8.8 | 0.17 | 0.50 | 0.5 | 1150 | 50 |
| | e10 | A27 | 8.9 | 0.17 | 0.52 | 0.5 | 1150 | 50 |
| | e11 | A27 | 8.9 | 0.17 | 0.52 | 5 | 740 | 50 |
| | e12 | A27 | 8.9 | 0.17 | 0.52 | 5 | 1200 | 50 |
| | e13 | A27 | 8.9 | 0.17 | 0.52 | 5 | 920 | 1 |
| | e14 | A28 | 8.9 | 0.21 | 0.16 | 0.5 | 1150 | 50 |
| | e15 | A28 | 2.1 | 0.20 | 0.25 | 0.5 | 1150 | 50 |
| | e16 | A28 | 2.3 | 0.22 | 0.25 | 0.5 | 1150 | 50 |
| | e17 | A28 | 8.8 | 0.22 | 0.23 | 0.5 | 1150 | 50 |
| | e18 | A28 | 9.0 | 0.19 | 0.23 | 0.5 | 1150 | 50 |
| | e19 | A28 | 9.0 | 0.19 | 0.23 | 5 | 740 | 50 |
| | e20 | A28 | 9.0 | 0.19 | 0.23 | 5 | 1200 | 50 |
| | e21 | A28 | 9.0 | 0.19 | 0.23 | 5 | 920 | 1 |
| | e22 | A29 | 8.9 | 0.26 | 0.12 | 0.5 | 1150 | 50 |
| | e23 | A29 | 2.2 | 0.24 | 0.24 | 0.5 | 1150 | 50 |
| | e24 | A29 | 2.0 | 0.25 | 0.25 | 0.5 | 1150 | 50 |
| | e25 | A29 | 8.8 | 0.25 | 0.22 | 0.5 | 1150 | 50 |
| | e26 | A29 | 8.9 | 0.23 | 0.21 | 0.5 | 1150 | 50 |
| | e27 | A29 | 8.9 | 0.23 | 0.21 | 5 | 740 | 50 |
| | e28 | A29 | 8.9 | 0.23 | 0.21 | 5 | 1200 | 50 |
| | e29 | A29 | 8.9 | 0.23 | 0.21 | 5 | 920 | 1 |
| | e30 | A30 | 8.8 | 0.38 | 0.11 | 0.5 | 1150 | 50 |
| | e31 | A30 | 2.1 | 0.36 | 0.23 | 0.5 | 1150 | 50 |
| | e32 | A30 | 1.9 | 0.38 | 0.24 | 0.5 | 1150 | 50 |
| | e33 | A30 | 8.8 | 0.37 | 0.22 | 0.5 | 1150 | 50 |
| | e34 | A30 | 8.7 | 0.35 | 0.21 | 0.5 | 1150 | 50 |
| | e35 | A30 | 8.7 | 0.35 | 0.21 | 5 | 740 | 50 |
| | e36 | A30 | 8.7 | 0.35 | 0.21 | 5 | 1200 | 50 |
| | e37 | A30 | 8.7 | 0.35 | 0.21 | 5 | 920 | 1 |
| | e38 | A31 | 8.7 | 0.26 | 0.33 | 0.5 | 1150 | 50 |
| | e39 | A31 | 2.1 | 0.24 | 0.50 | 0.5 | 1150 | 50 |
| | e40 | A31 | 1.9 | 0.26 | 0.51 | 0.5 | 1150 | 50 |
| | e41 | A31 | 8.7 | 0.25 | 0.49 | 0.5 | 1150 | 50 |
| | e42 | A31 | 8.3 | 0.24 | 0.51 | 0.5 | 1150 | 50 |
| | e43 | A31 | 8.8 | 0.23 | 0.52 | 5 | 740 | 50 |
| | e44 | A31 | 8.8 | 0.23 | 0.52 | 5 | 1200 | 50 |
| | e45 | A31 | 8.8 | 0.23 | 0.52 | 5 | 920 | 1 |

TABLE 16

| | Symbol | Steel No. | Coated steel member | | | | | | |
|---|---|---|---|---|---|---|---|---|---|
| | | | Maximum C content in high Al content region (mass %) | Maximum C content in low Al content region (mass %) | Maximum C content in surface layer area of steel sheet substrate (mass %) | Maximum Cr content in high Al content region (mass %) | Tensile strength (MPa) | Bending angle (°) | Impact value (J/cm$^2$) |
| Comparative Example | e1 | A27 | 0.15 | 0.17 | 0.28 | 0.22 | 1682 | 50 | 43 |
| | e2 | A27 | 0.15 | 0.17 | 0.27 | 0.20 | 1683 | 49 | 45 |
| | e3 | A27 | 0.14 | 0.16 | 0.28 | 0.35 | 1688 | 49 | 43 |
| | e4 | A27 | 0.15 | 0.17 | 0.28 | 0.34 | 1682 | 50 | 44 |
| | e5 | A27 | 0.14 | 0.16 | 0.27 | 0.34 | 1683 | 49 | 44 |
| | e6 | A27 | 0.14 | 0.17 | 0.27 | 0.36 | 1681 | 48 | 43 |
| | e7 | A27 | 0.15 | 0.17 | 0.27 | 0.35 | 1689 | 49 | 45 |
| | e8 | A27 | 0.15 | 0.17 | 0.28 | 0.35 | 1689 | 49 | 43 |
| | e9 | A27 | 0.15 | 0.16 | 0.27 | 0.35 | 1688 | 50 | 44 |
| | e10 | A27 | 0.14 | 0.16 | 0.27 | 0.35 | 1690 | 50 | 46 |
| | e11 | A27 | 0.03 | 0.05 | 0.17 | 0.31 | 876 | 89 | 91 |
| | e12 | A27 | 0.14 | 0.16 | 0.27 | 0.36 | 1659 | 51 | 45 |
| | e13 | A27 | 0.03 | 0.07 | 0.18 | 0.33 | 642 | 100 | 105 |
| | e14 | A28 | 0.16 | 0.19 | 0.29 | 0.10 | 1752 | 48 | 42 |
| | e15 | A28 | 0.15 | 0.19 | 0.29 | 0.12 | 1754 | 49 | 41 |
| | e16 | A28 | 0.16 | 0.18 | 0.29 | 0.12 | 1753 | 48 | 42 |
| | e17 | A28 | 0.15 | 0.18 | 0.30 | 0.12 | 1754 | 47 | 43 |
| | e18 | A28 | 0.15 | 0.18 | 0.29 | 0.12 | 1753 | 48 | 41 |
| | e19 | A28 | 0.04 | 0.06 | 0.18 | 0.11 | 901 | 87 | 87 |
| | e20 | A28 | 0.15 | 0.18 | 0.30 | 0.13 | 1720 | 49 | 42 |
| | e21 | A28 | 0.04 | 0.08 | 0.19 | 0.11 | 689 | 99 | 103 |
| | e22 | A29 | 0.18 | 0.21 | 0.34 | 0.09 | 1946 | 43 | 34 |
| | e23 | A29 | 0.18 | 0.20 | 0.34 | 0.11 | 1948 | 43 | 33 |
| | e24 | A29 | 0.17 | 0.21 | 0.35 | 0.12 | 1945 | 42 | 34 |
| | e25 | A29 | 0.18 | 0.20 | 0.34 | 0.13 | 1943 | 43 | 33 |
| | e26 | A29 | 0.17 | 0.20 | 0.34 | 0.12 | 1942 | 43 | 34 |
| | e27 | A29 | 0.05 | 0.09 | 0.23 | 0.10 | 932 | 87 | 83 |
| | e28 | A29 | 0.17 | 0.21 | 0.35 | 0.13 | 1911 | 44 | 34 |
| | e29 | A29 | 0.05 | 0.11 | 0.24 | 0.11 | 710 | 92 | 97 |
| | e30 | A30 | 0.26 | 0.33 | 0.49 | 0.09 | 2618 | 37 | 17 |
| | e31 | A30 | 0.25 | 0.32 | 0.49 | 0.12 | 2619 | 37 | 15 |
| | e32 | A30 | 0.25 | 0.33 | 0.49 | 0.12 | 2620 | 36 | 16 |
| | e33 | A30 | 0.25 | 0.32 | 0.49 | 0.12 | 2612 | 36 | 16 |
| | e34 | A30 | 0.25 | 0.32 | 0.49 | 0.12 | 2617 | 37 | 17 |
| | e35 | A30 | 0.06 | 0.15 | 0.35 | 0.10 | 1081 | 85 | 80 |
| | e36 | A30 | 0.24 | 0.32 | 0.49 | 0.13 | 2578 | 38 | 17 |
| | e37 | A30 | 0.07 | 0.17 | 0.36 | 0.11 | 842 | 89 | 91 |
| | e38 | A31 | 0.18 | 0.21 | 0.34 | 0.23 | 1965 | 41 | 31 |
| | e39 | A31 | 0.18 | 0.21 | 0.34 | 0.35 | 1968 | 41 | 30 |
| | e40 | A31 | 0.18 | 0.21 | 0.34 | 0.34 | 1965 | 40 | 31 |
| | e41 | A31 | 0.18 | 0.20 | 0.34 | 0.35 | 1963 | 41 | 30 |
| | e42 | A31 | 0.17 | 0.21 | 0.34 | 0.35 | 1959 | 40 | 30 |
| | e43 | A31 | 0.05 | 0.10 | 0.24 | 0.32 | 950 | 85 | 80 |
| | e44 | A31 | 0.18 | 0.21 | 0.35 | 0.36 | 1932 | 42 | 32 |
| | e45 | A31 | 0.05 | 0.10 | 0.24 | 0.33 | 743 | 90 | 96 |

As can be seen from Tables 13 to 16, Invention Examples E1 to E35 satisfying the ranges of the present invention obtained good results in terms of both the structure and properties, but Comparative Examples e1 to e45 not satisfying the ranges of the present invention obtained results not satisfying at least one of the structure and properties.

INDUSTRIAL APPLICABILITY

According to the present invention, it is possible to obtain a high strength coated steel member and a steel sheet having excellent collision characteristics. The coated steel member according to the present invention is particularly suitable for use as a frame component of a vehicle.

BRIEF DESCRIPTION OF THE REFERENCE SYMBOLS

1 Coated steel member
11 Steel sheet substrate
12 Al—Fe-based coating
121 Low Al content region
122 High Al content region
2 Coated steel sheet
21 Steel sheet
22 Al-based coating
221 Lower layer
222 Upper layer

The invention claimed is:
1. A coated steel sheet comprising:
a steel sheet containing, as a chemical composition, by mass %,
C: 0.25% to 0.65%,
Si: 0.10% to 2.00%,
Mn: 0.30% to 3.00%,
P: 0.050% or less,
S: 0.0100% or less,
N: 0.010% or less,
Ti: 0.010% to 0.100%,
B: 0.0005% to 0.0100%,

Nb: 0.02% to 0.10%,
Mo: 0% to 1.00%,
Cu: 0% to 1.00%,
Cr: 0% to 1.00%,
Ni: 0% to 1.00%,
V: 0% to 1.00%,
Ca: 0% to 0.010%,
Al: 0% to 1.00%,
Sn: 0% to 1.00%,
W: 0% to 1.00%,
Sb: 0% to 1.00%,
REM: 0% to 0.30%, and
a remainder of Fe and impurities; and
a coating formed on a surface of the steel sheet and containing Al,
wherein the coating includes a lower layer being present on a side of the steel sheet and containing 3 mass % or more and less than 70 mass % of Al and an upper layer containing 70 mass % or more and 95 mass % or less of Al,
the lower layer contains Cr in an amount of 1.2 times or more a Cr content in the steel sheet by mass %, or the upper layer contains Si and Ni in a total amount of 5.0 mass % or more and 30.0 mass % or less, and
a maximum C content in a range from an interface between the steel sheet and the coating to a depth of 20 µm on a side of the steel sheet is 80% or less of an average C content in an overall sheet thickness of the steel sheet.

2. The coated steel sheet according to claim 1,
wherein the steel sheet contains, as the chemical composition, Cr: 0.05% to 1.00%, and
in the coating, the lower layer contains Cr in an amount of 1.2 times or more the Cr content in the steel sheet, and the upper layer contains Si and Ni in a total amount of 5.0 mass % or more and 30.0 mass % or less.

3. A method for producing a coated steel sheet according to claim 1 or 2, the method comprising:
a slab preparation step of melting a steel containing, as a chemical composition, by mass %, C: 0.25% to 0.65%, Si: 0.10% to 2.00%, Mn: 0.30% to 3.00%, P: 0.050% or less, S: 0.0100% or less, N: 0.010% or less, Ti: 0.010% to 0.100%, B: 0.0005% to 0.0100%, Nb: 0.02% to 0.10%, Mo: 0% to 1.00%, Cu: 0% to 1.00%, Cr: 0% to 1.00%, Ni: 0% to 1.00%, V: 0% to 1.00%, Ca: 0% to 0.010%, Al: 0% to 1.00%, Sn: 0% to 1.00%, W: 0% to 1.00%, Sb: 0% to 1.00%, REM: 0% to 0.30%, and a remainder of Fe and impurities, and casting to obtain a slab;
a hot rolling step of hot-rolling the slab to obtain a hot-rolled steel sheet;
a coiling step of coiling the hot-rolled steel sheet;
a hot-rolled sheet annealing step of annealing the hot-rolled steel sheet after the coiling in an atmosphere containing 80% or more of nitrogen at 450° C. to 800° C. for 5 hours or longer;
as necessary, a cold rolling step of descaling the hot-rolled steel sheet and cold-rolling the hot-rolled steel sheet to obtain a cold-rolled steel sheet;
as necessary, an annealing step of annealing the hot-rolled steel sheet or the cold-rolled steel sheet to obtain an annealed steel sheet; and
a coating step of forming an Al-based coating on the hot-rolled steel sheet, the cold-rolled steel sheet, or the annealed steel sheet to obtain a coated steel sheet.

4. A method for producing a coated steel sheet according to claim 1 or 2, the method comprising:
a slab preparation step of melting a steel containing, as a chemical composition, by mass %, C: 0.25% to 0.65%, Si: 0.10% to 2.00%, Mn: 0.30% to 3.00%, P: 0.050% or less, S: 0.0100% or less, N: 0.010% or less, Ti: 0.010% to 0.100%, B: 0.0005% to 0.0100%, Nb: 0.02% to 0.10%, Mo: 0% to 1.00%, Cu: 0% to 1.00%, Cr: 0% to 1.00%, Ni: 0% to 1.00%, V: 0% to 1.00%, Ca: 0% to 0.010%, Al: 0% to 1.00%, Sn: 0% to 1.00%, W: 0% to 1.00%, Sb: 0% to 1.00%, REM: 0% to 0.30%, and a remainder of Fe and impurities, and casting to obtain a slab;
a hot rolling step of hot-rolling the slab to obtain a hot-rolled steel sheet;
a coiling step of coiling the hot-rolled steel sheet;
as necessary, a hot-rolled sheet annealing step of annealing the hot-rolled steel sheet;
as necessary, a cold rolling step of descaling the hot-rolled steel sheet and cold-rolling the hot-rolled steel sheet to obtain a cold-rolled steel sheet;
an annealing step of annealing the hot-rolled steel sheet or the cold-rolled steel sheet to obtain an annealed steel sheet in an atmosphere having a dew point of 1° C. or higher and in a temperature range of 700° C. to 950° C.; and
a coating step of forming an Al-based coating on a surface of the annealed steel sheet to obtain a coated steel sheet by immersing the annealed steel sheet in a plating bath containing Si and Ni in a total amount of 7.0 to 30.0 mass % and a remainder of Al and impurities.

5. A method for producing a coated steel sheet according to claim 1 or 2, the method comprising:
a slab preparation step of melting a steel containing, as a chemical composition, by mass %, C: 0.25% to 0.65%, Si: 0.10% to 2.00%, Mn: 0.30% to 3.00%, P: 0.050% or less, S: 0.0100% or less, N: 0.010% or less, Ti: 0.010% to 0.100%, B: 0.0005% to 0.0100%, Nb: 0.02% to 0.10%, Mo: 0% to 1.00%, Cu: 0% to 1.00%, Cr: 0% to 1.00%, Ni: 0% to 1.00%, V: 0% to 1.00%, Ca: 0% to 0.010%, Al: 0% to 1.00%, Sn: 0% to 1.00%, W: 0% to 1.00%, Sb: 0% to 1.00%, REM: 0% to 0.30%, and a remainder of Fe and impurities, and casting to obtain a slab;
a hot rolling step of hot-rolling the slab to obtain a hot-rolled steel sheet;
a coiling step of coiling the hot-rolled steel sheet;
a hot-rolled sheet annealing step of annealing the hot-rolled steel sheet after the coiling in an atmosphere containing 80% or more of nitrogen at 450° C. to 800° C. for 5 hours or longer;
as necessary, a cold rolling step of descaling the hot-rolled steel sheet and cold-rolling the hot-rolled steel sheet to obtain a cold-rolled steel sheet;
an annealing step of annealing the hot-rolled steel sheet or the cold-rolled steel sheet to obtain an annealed steel sheet in an atmosphere having a dew point of 1° C. or higher and in a temperature range of 700° C. to 950° C.; and
a coating step of forming an Al-based coating on a surface of the annealed steel sheet to obtain a coated steel sheet by immersing the annealed steel sheet in a plating bath containing Si and Ni in a total amount of 7.0 to 30.0 mass % and a remainder of Al and impurities.

6. A method for producing a coated steel member, the method comprising:
- a heat treatment step of heating the coated steel sheet according to claim 1 or 2 to an $Ac_3$ point to ($Ac_3$ point+300)° C. at a temperature rising rate of 1.0 to 1000° C./s, and thereafter cooling the coated steel sheet to an Ms point or lower at an upper critical cooling rate or more.

* * * * *